United States Patent
Kayano et al.

(10) Patent No.: US 7,222,551 B2
(45) Date of Patent: May 29, 2007

(54) AUTOMATIC TRANSMISSION

(75) Inventors: Mitsuo Kayano, Tokyo (JP); Toshimichi Minowa, Tokyo (JP); Takashi Okada, Tokyo (JP); Tatsuya Ochi, Tokyo (JP); Hiroshi Sakamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/239,149

(22) PCT Filed: Apr. 24, 2001

(86) PCT No.: PCT/JP01/03513

§ 371 (c)(1),
(2), (4) Date: Dec. 17, 2002

(87) PCT Pub. No.: WO01/81788

PCT Pub. Date: Nov. 1, 2001

(65) Prior Publication Data

US 2003/0150286 A1 Aug. 14, 2003

(30) Foreign Application Priority Data

Apr. 25, 2000 (JP) ............................. 2000-124011

(51) Int. Cl.
*F16H 63/00* (2006.01)
(52) U.S. Cl. .................... 74/336 R; 74/333; 74/335; 74/339
(58) Field of Classification Search .................. 74/339, 74/333, 335, 336 R, 340
See application file for complete search history.

(56) References Cited

U.S. PATENT DOCUMENTS

| 3,802,293 | A | * | 4/1974 | Winckler et al. .............. 74/745 |
| 4,519,484 | A | * | 5/1985 | Nagaoka et al. ........... 192/3.58 |
| 4,616,521 | A | * | 10/1986 | Akashi et al. ................ 74/335 |
| 5,036,717 | A | * | 8/1991 | Nakayama et al. ........... 74/333 |
| 5,066,268 | A | * | 11/1991 | Kobayashi .................. 475/249 |
| 5,906,557 | A | * | 5/1999 | Kobayashi .................. 475/199 |
| 6,332,371 | B1 | * | 12/2001 | Ohashi et al. ................ 74/331 |
| 6,514,172 | B2 | * | 2/2003 | Kayano et al. ............. 477/110 |
| 6,546,830 | B2 | * | 4/2003 | Kanazawa .................... 74/333 |
| 6,550,352 | B2 | * | 4/2003 | Okada et al. ................ 74/335 |
| 6,561,052 | B2 | * | 5/2003 | Kayano et al. ............... 74/339 |
| 6,619,152 | B2 | * | 9/2003 | Ochi et al. .................... 74/335 |
| 6,647,817 | B2 | * | 11/2003 | Kobayashi .................. 74/359 |

FOREIGN PATENT DOCUMENTS

| JP | 62-190152 | 12/1987 |
| JP | 62-191947 | 12/1987 |
| JP | 63002736 | 1/1988 |
| JP | 06330960 | 11/1994 |

* cited by examiner

Primary Examiner—David D. Le
(74) Attorney, Agent, or Firm—Crowell & Moring LLP

(57) ABSTRACT

A mesh-type automatic transmission includes a power input shaft for introducing power of an engine, a plurality of transmission gears, a plurality of cogged clutches, a power output shaft for outputting driving force, a counter shaft, and a plurality of counter gears, for transmitting power of the engine to the power output shaft by rotating the power input shaft with the power of the engine, rotating the counter shaft, and transmitting rotation of the counter shaft to the power output shaft with automatic gear change by engaging and disengaging the cogged clutches to one of the transmission gears corresponding to the speed. The counter shaft is provided with an assist mechanism for transmitting rotational force of the power input shaft to the power output shaft by transmitting rotation of the counter shaft via the assist gear, during the period of disengagement of a gear to the engagement of a new gear during gear change.

17 Claims, 18 Drawing Sheets

▨ : TRANSMITTING POWER
▢ : IDLING

▨ : TRANSMITTING POWER
☐ : IDLING

▨ : TRANSMITTING POWER
☐ : IDLING

Fig. 16

| ASSIST GEAR RATIO | 2nd | 3rd | 4th | 5th |
|---|---|---|---|---|
| TRANSMISSION ENABLED ZONE | × | △ | ○ | ◎ |
| TRANSMISSION PERFORMANCE | × | ○ | △ | × |
| DURABILITY | × | ○ | △ | × |

AUTOMATIC TRANSMISSION

FIELD OF THE INVENTION

The present invention relates to an automatic transmission.

BACKGROUND ART

Heretofore, there is known an automatic transmission using a transmission device of a conventional manual transmission mechanism, that is, a mesh gear type transmission mechanism, which is also provided with a clutch for engaging and disengaging the engine with the transmission device, and an actuator for moving the clutch to engage and disengage each gear with the power output shaft, and which performs automatic transmission (gear change) by controlling the hydraulic pressure on the actuator for the engagement and disengagement of the clutch.

In a conventional automatic transmission thus constituted, there exists a condition where the cogged clutch is engaged to none of the gears, which is so-called a neutral condition.

In such neutral condition where the cogged clutch is engaged to none of the gears during gear change from first gear to second gear, from second gear to third gear, from third gear to fourth gear, and from fourth gear to fifth gear, the driver might encounter a sort of shock as if the vehicle decelerated even when the vehicle is actually accelerating, because the cogged clutch during gear change is left unmeshed with any of the gears and therefore the acceleration power is not transmitted to the power output axle.

Accordingly, it is an object of the present invention to provide an automatic transmission that relieves the shock caused by the engagement and disengagement of the clutch during acceleration.

SUMMARY OF THE INVENTION

In order to achieve the above-mentioned object, in one aspect, the present invention provides a mesh type automatic transmission where, for the purpose of transmitting power of the engine to a power output shaft, the power of the engine rotates a power input shaft, which causes additional rotation of a counter shaft, which has, in turn, its rotation cammed to various gears by transmission gears respectively engaging and disengaging with a cogged clutch for automatic velocity control, which is transmitted to the power output shaft by a counter gear, and the counter shaft includes an assist mechanism for transmitting rotational force of the power input shaft to the power output shaft without engagement of the cogged clutch with any of the transmission gears during the time when the cogged clutch is switching gears.

In order to achieve the above-mentioned object, according to another aspect, the assist mechanism according to the present invention is placed at an end of the counter shaft facing the rear lateral side of a vehicle body.

In order to achieve the above-mentioned object, according to still another aspect, the assist mechanism according to the present invention is placed below a horizontal plane in which a central axis of the power output shaft lies.

In order to achieve the above-mentioned object, according to a further aspect, the assist mechanism according to the present invention is designed to respond to a command to switch the cogged clutch and start engagement with the power input/output shafts prior to a complete disengagement of the cogged clutch from the current transmission gear, effect the engagement by engine torque to transmit the rotational force from the power input shaft to the power output shaft upon a complete release of the cogged clutch from the current transmission gear, and respond to another switch command and disengage from the power input/output shafts upon engagement of cogged clutch with the newly specified transmission gear.

In order to achieve the above-mentioned object, in yet another aspect, the assist mechanism according to the present invention is comprised of an assist clutch and an output gear, the assist clutch including a clutch plate fixed to the counter shaft and rotating along with the counter shaft and an assist gear rotatably placed on the counter shaft for pressing the clutch plate to transmit rotation of the clutch plate, the output gear being meshed with the assist gear of the assist clutch and fixed to the power output shaft for attaining the highest gear, whereby the assist mechanism responds to an assist command to transmit rotation of the clutch plate through the assist gear and the output gear to the power output shaft.

BRIEF DESCRIPTION OF THE DRAWINGS

FIG. 16 is a table showing comparison information with the reference assist gear ratio;

BEST MODE FOR IMPLEMENTING THE INVENTION

With reference to FIGS. 1 to 7, preferred embodiments of an automatic transmission will now be described in accordance with the present invention.

Figure 1:
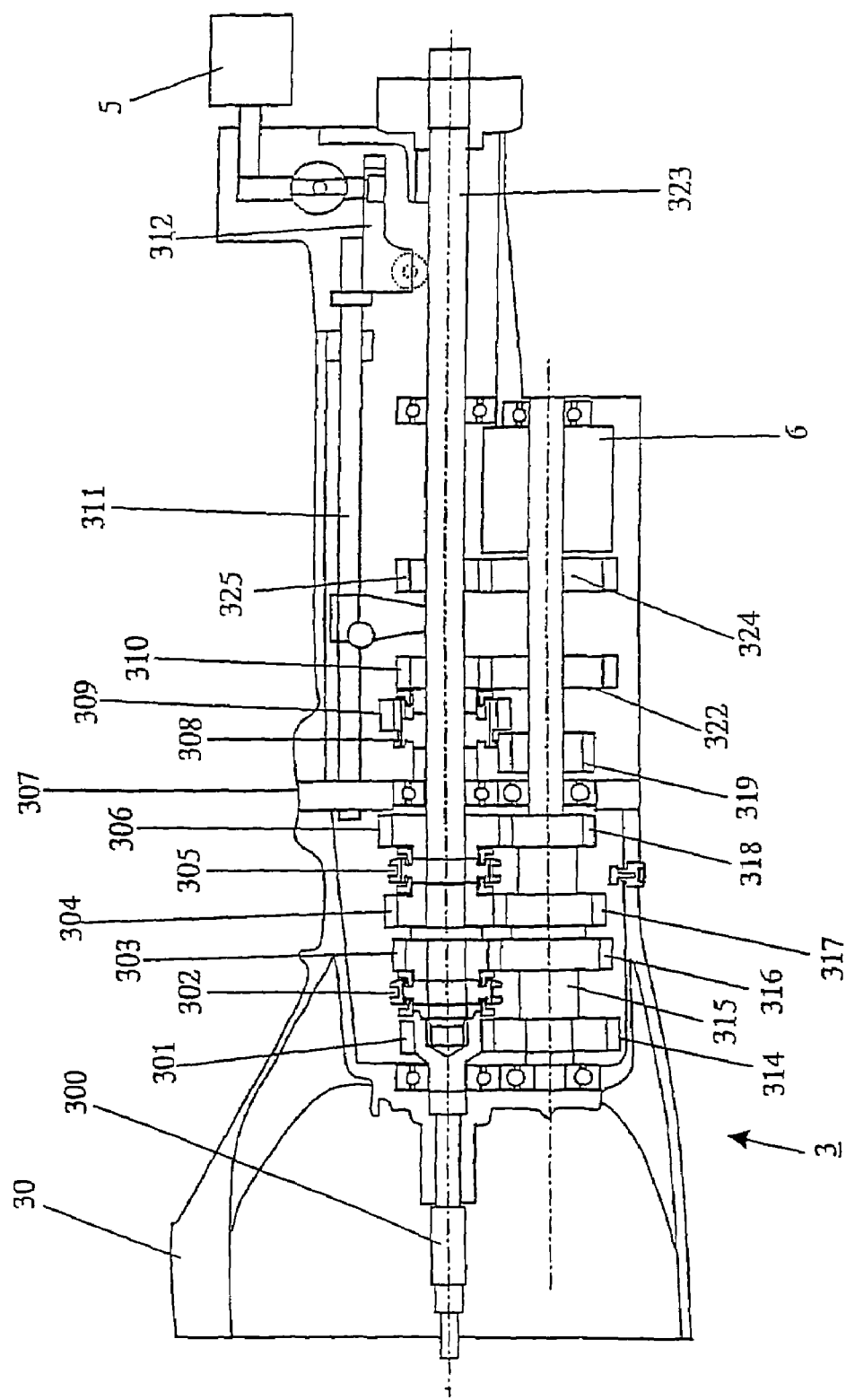
FIG. 1 is an overall structural view of an embodiment of an automatic transmission according to the present invention.
Figure 2:
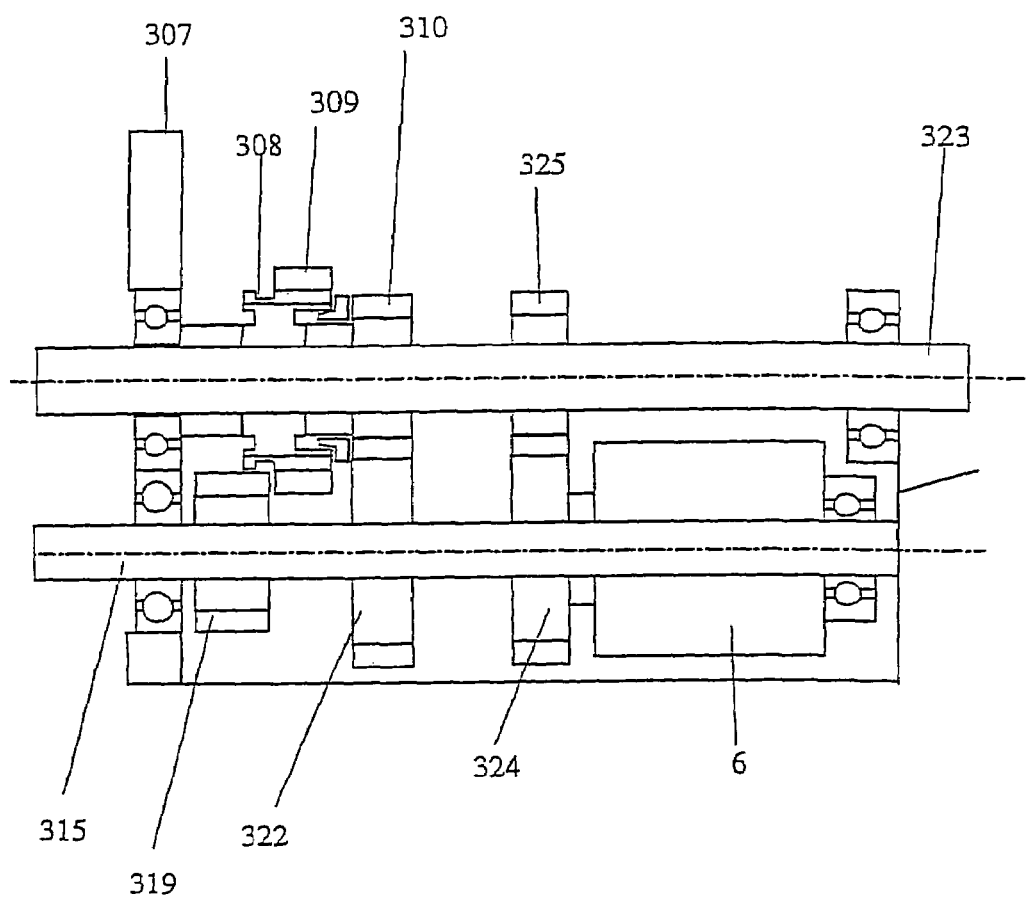
FIG. 2 is an enlarged view of an assist mechanism shown in FIG. 1.
Figure 3:
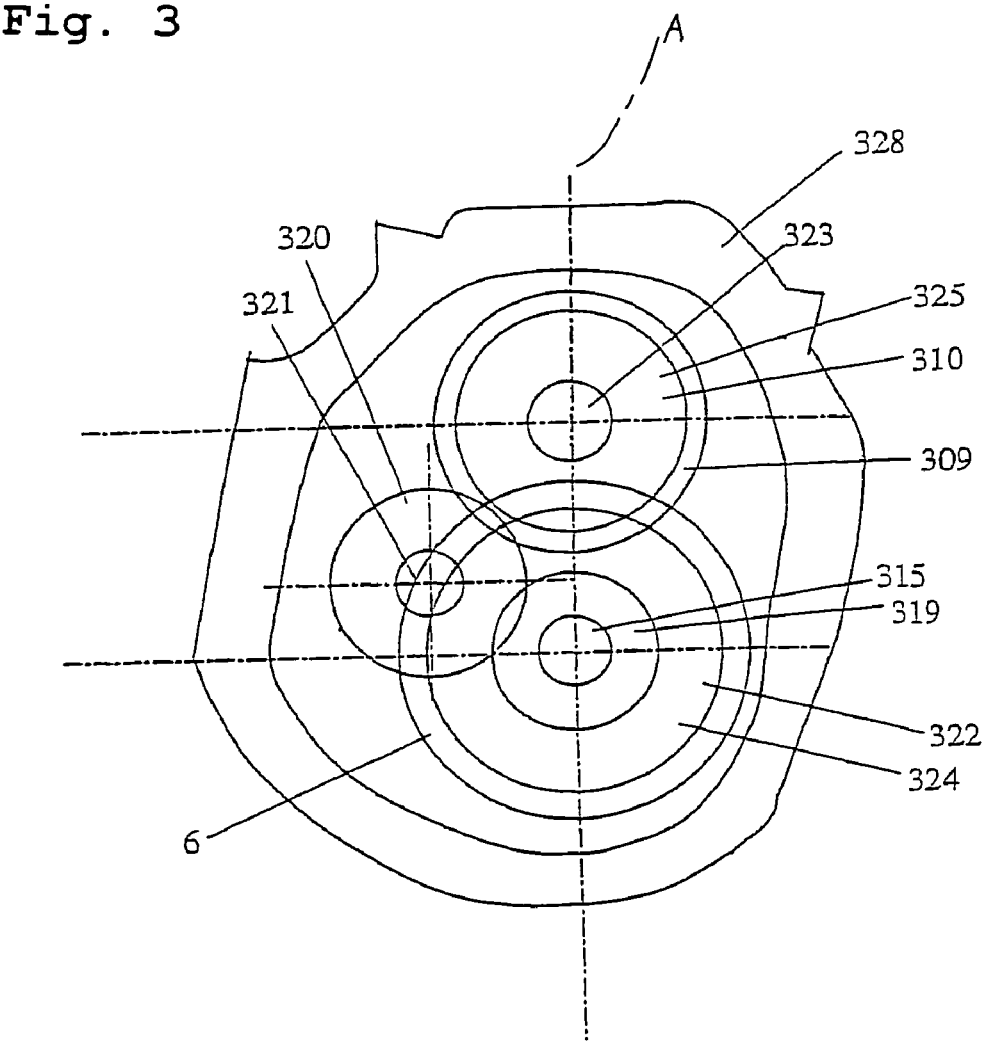
FIG. 3 is a right side view of the automatic transmission in FIG. 1.
Figure 4:
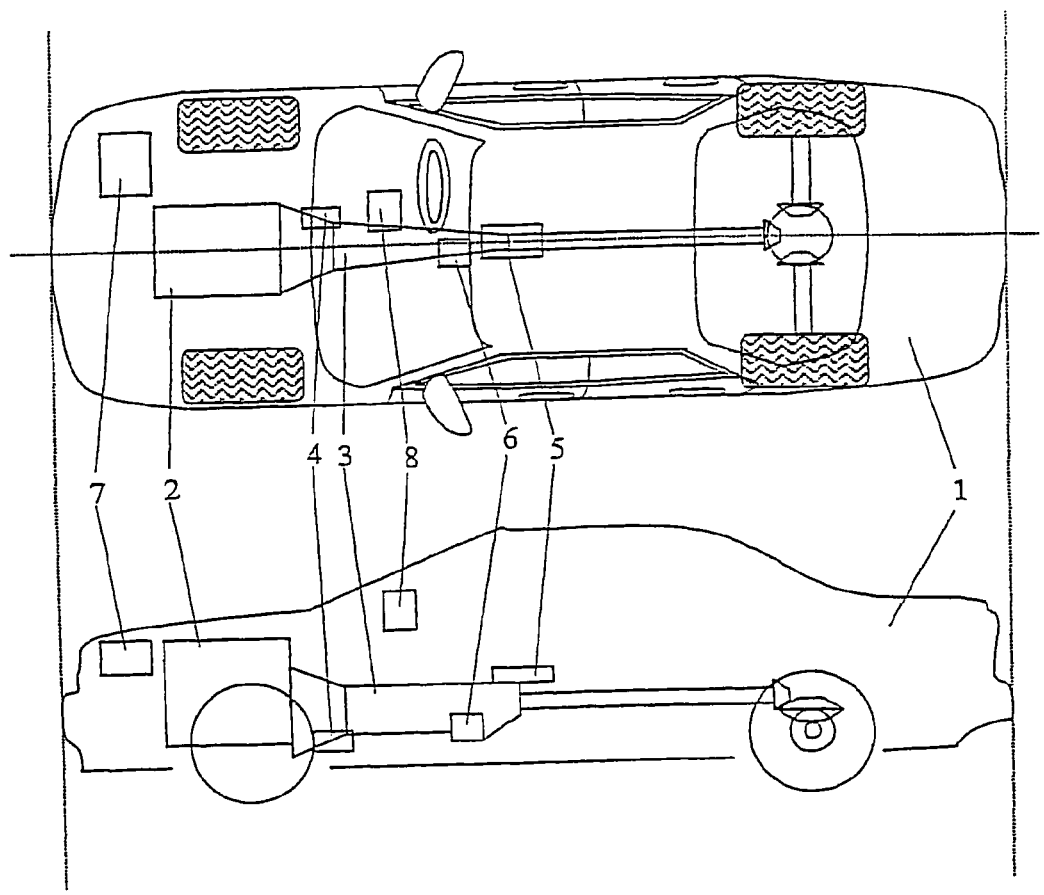
FIG. 4 is a view indicating a position where the automatic transmission of the present invention is provided in a vehicle body.
Figure 5:
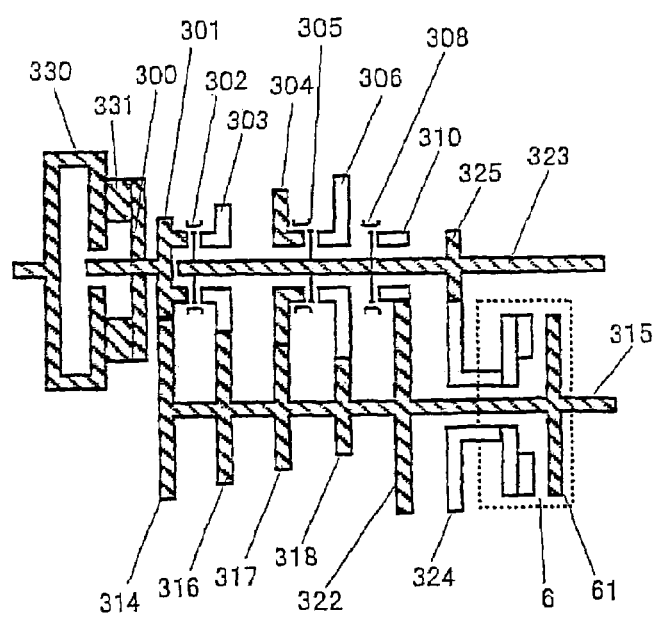
FIG. 5 is a view explaining engagement and disengagement of the assist mechanism during gear change.
Figure 6:
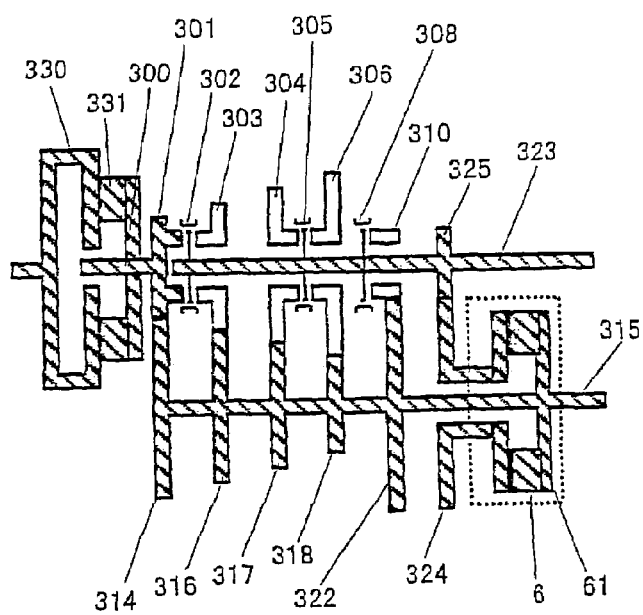
FIG. 6 is a view explaining engagement and disengagement of the assist mechanism during gear change.
Figure 7:
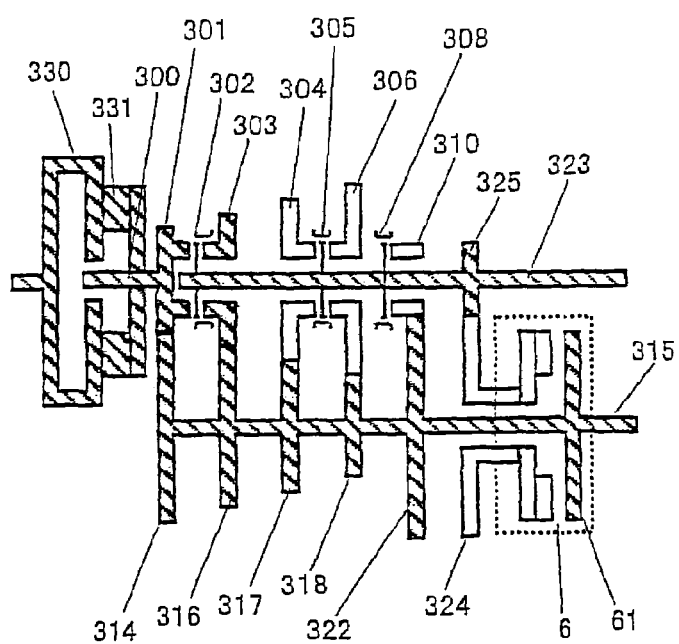
FIG. 7 is a view explaining engagement and disengagement of the assist mechanism during gear change.

FIG. 1 is an overall structural view of an embodiment of the automatic transmission according to the present invention, FIG. 2 is an enlarged view of an assist mechanism shown in FIG. 1, FIG. 3 is a right side view of the automatic transmission shown in FIG. 1, FIG. 4 is a view indicating the position where the automatic transmission of the present invention is provided in a vehicle body, and FIG. 5 through FIG. 7 are views explaining engagement and disengagement of the assist mechanism during gear change.

In FIG. 1, an automatic transmission 3 is housed in a transmission case 30. In the transmission case 30, a power input shaft 300 rotated by engaging with a main drive clutch (not shown) is rotatably supported. A drive gear 301 is provided at the end of the power input shaft 300 facing the rear of the vehicle. The drive gear 301 rotates along with the rotation of the power input shaft 300. Also, in an opposite side of the drive gear 301, a power output shaft 323 is rotatably provided on an extension of the power input shaft 300 without contacting the drive gear 301, so that the axial center of the power output shaft 323 coincides with the axial center of the power input shaft 300.

Also, below the power output shaft 323, a counter shaft 315 is rotatably supported in parallel with the power output shaft 323. A counter drive gear 314 is fixed to an end of the counter shaft 315 facing the front of the vehicle body. The counter drive gear 314 meshes with the drive gear 301, and is constituted so as to rotate with the drive gear 301. The drive gear 301 rotates with the rotation of the power input shaft 300, when the rotation of the engine is transmitted to the power input shaft 300 by the engagement of the main drive clutch. It is constituted so that when the drive gear 301 rotates, the counter drive gear 314 meshing with the drive gear 301 rotates, and the counter shaft 315 fixed with the counter drive gear 314 rotates. A counter third gear 316 is fixed to the counter shaft 315 at its rearward along the vehicle body at a predetermined interval from the counter drive gear 314, and a counter second gear 317 is also fixed to the same at a predetermined interval from the counter third gear 316.

Also, to the rearward side along the vehicle body from the counter second gear 317, there is fixed a counter first gear 318 at a predetermined interval from the counter second gear 317. Moreover, to the rearward side of the vehicle body from the counter first gear 318, there is fixed a counter fifth gear 322 at a predetermined interval from the counter first gear 318.

The counter third gear 316 is meshed with a third gear 303, which is rotatably provided to the power output shaft 323. To the power output shaft 323, there is provided a cogged clutch 302 between the third gear 303 and the drive gear 301. The cogged clutch 302 is connected to the power output shaft 323. That is, the cogged clutch 302 is slidably connected onto the power output shaft 323 and transmits the output of the power input shaft 300 to the power output shaft 323 by shifting the cogged clutch 302 so as to engage the cogged clutch 302 with the drive gear 301 (fourth speed position), or transmits the rotation of the power input shaft 300 to the power output shaft 323 via the counter third gear 316 with the speed changed by shifting the cogged clutch 302 so as to engage the cogged clutch 302 with the third gear 303.

Also, the counter second gear 317 is meshed with a second gear 304, which is rotatably provided to the power output shaft 323. Moreover, the counter first gear 318 is meshed with a first gear 306, which is rotatably provided to the power output shaft 323. To the power output shaft 323, there is provided and connected a cogged clutch 305 between the second gear 304 and the first gear 306. The cogged clutch 305 is slidable along on the power output shaft 323 and transmits the output of the power input shaft 300 via the counter second gear 317 with the speed changed by shifting the cogged clutch 305 in the frontward direction of the vehicle body so as to connect with the second gear 304. Also, the cogged clutch 305 transmits the output of the power input shaft 300 via the counter first gear 318 with the speed changed by shifting the cogged clutch 305 in the rearward direction of the vehicle body so as to connect with the first gear 306. Therefore, even if rotation of the counter shaft 315 causes the counter second gear 317 and the counter first gear 318 to rotate, the rotational force of the counter shaft 315 is not output to the power shaft 323 as long as the cogged clutch 305 is not meshed.

The operation of the cogged clutch 302 and the cogged clutch 305 is performed by moving a striking rod 311 via a striking arm 312, by operating the actuator of a shift select controller 5. The shift select controller 5 operates the switching of the transmission gear, selected from the accelerator command value output based on the amount of the accelerator pedal depressed by the driver and the current speed of the automobile.

At the rearward side of the vehicle body of the counter shaft 315 than an intermediate plate 307, there is fixed a reverse counter gear 319. The reverse counter gear 319 operates when the vehicle moves backward. The reverse counter gear 319 is meshed with a reverse idler gear 320 rotatably mounted to a reverse shaft 321, as shown in FIG. 3. The reverse idler gear 320 is constantly rotated by the reverse counter gear 319 rotating together with the counter shaft 315. A reverse gear 309 is rotatably provided to the power output shaft 323. To the frontward of the vehicle from the reverse gear 309, a cogged clutch 308 is provided and connected to the power output shaft 323.

Moreover, the counter fifth gear 322 is fixed to the rearward side of the vehicle body at a predetermined interval from the reverse counter gear 319 on the counter shaft 315. The counter fifth gear 322 meshes with a fifth gear 310, which is rotatably provided to the power output shaft 323.

The fifth gear 310 transmits the output of the power input shaft 300 to the power output shaft 323 by engaging with the cogged clutch 308 provided and connected to the power output shaft 323. That is, the cogged clutch 308 is slidable along on the power output shaft 323 and transmits the output of the power input shaft 300 via the counter fifth gear 322 with the speed changed, by shifting the cogged clutch 308 to the rearward direction of the vehicle body, so as to connect with the fifth gear 310. Therefore, even when the counter fifth gear 322 rotates along with the counter shaft 315, the rotational force of the counter shaft 315 is not output to the power output shaft 323, as long as the cogged clutch 308 is not meshed.

Also, the position of the counter shaft 315 is formed so that it is positioned below the horizontal plane where the central axis of the power output shaft 323 lies, as shown in FIG. 3. The position of the counter shaft 315 is formed so that it is positioned below the horizontal plane where the central axis of the power output shaft 323 lies. It should be positioned below the horizontal surface including the central axis of the power output shaft 323 and the position is not necessarily specified. However, it is ideally constituted so that the central axis of the counter shaft 315 is positioned perpendicular to the central axis of the power output shaft 323, that is, on the connection A of the central axis. In this way, the assist mechanism could be provided to the lowermost portion of the transmission case 30, so that the inner space of the transmission case could effectively be used, and the cooling effect from the oil could be expected. Moreover, the assist mechanism could be mounted to a position without hindering the access to the gear oil injection hole.

Moreover, at the lateral end portion of the counter shaft 315 on its rearward side along the vehicle body, there is provided an assist clutch 6, as shown in FIG. 2. In this position of the assist clutch 6 at the lateral end portion of the counter shaft 315 in its rearward side along the vehicle body, repairing, exchanging and the like, of the assist clutch 6 could be performed with ease, when abnormality occurs to the assist clutch 6.

Furthermore, by mounting the assist clutch 6 to the counter shaft 315, the size of the transmission case 30 could be reduced, and the structure of the automatic transmission 3 could be miniaturized. Furthermore, by providing the assist clutch 6 at the lateral rearward end portion of the counter shaft 315 of the vehicle, assembly could be facilitated.

According to the present embodiment, the location of the assist clutch 6 is the lateral end portion of the counter shaft 315 at the rear side of the car body. However, the assist clutch 6 may not necessarily be located to the lateral end portion of the counter shaft 315 at the rearward side along the vehicle body, as long as it is provided on the counter shaft 315. In order to enable repairing, exchanging and the like of the assist clutch 6 when abnormality occurs to the assist clutch 6, it is ideal to provide the assist clutch 6 to the counter shaft 315 at its lateral end portion in its rearward along the vehicle body.

Also, the assist clutch 6 has a clutch plate 61 fixed to the counter shaft 315, as shown in FIG. 5. The clutch plate 61 is constantly rotating with the rotation of the counter shaft 315. Opposing to the clutch plate 61, an assist gear 324 provided with a rotating plate which presses against the clutch plate 61 is rotatably provided on the counter shaft 315. The assist gear 324 is meshed with an assist output gear 324. The assist gear 324 is constantly rotated by the assist output gear 325 which is rotated by the rotation of the power output shaft 323, as long as the clutch plate 61 and the assist gear 324 are disengaged. When the clutch plate 61 and the assist gear 324 are engaged, the rotational force of the counter shaft 315 is transmitted to the assist gear 324 via the clutch plate 61, thereby rotating the assist gear 324, and rotating the assist output gear 325 by the rotation of the assist gear, so as to provide assist force of the assist clutch 6 to the power output shaft 323.

As seen from above, the assist gear 324 is rotatably provided to the counter shaft 315 to rotate independent of the counter shaft 315. Because the clutch plate 61 is fixed to the counter shaft 315 provided with the assist clutch 6, and the rotation of the counter shaft 315 is transmitted to the power output shaft 323 via the clutch plate 61 through the assist gear 324 and the assist output gear 325, by connecting the clutch plate 61 and the assist gear 324 from operating the assist clutch 6, the rotational force of the power input shaft 300 could be assisted to the power output shaft 323 by the operation of the assist clutch 6, when rotation of the power input shaft 300 is not transmitted to the power output shaft 323 during the period of disengagement of the currently engaged gear and the engagement of a new gear at gear change (during neutral). Therefore, the shock originated during the period of disengagement of the currently engaged gear and the engagement of the new gear at the gear change could be eliminated.

The switching of the reverse gear 309 is performed by the cogged clutch 308. The cogged clutch 308 is constituted so as to slide freely on the power output shaft 323. By shifting the cogged clutch 308 to the frontward direction of the car body, the reverse gear 309 connected to the power output shaft 323 and the reverse idler gear 320 are meshed, and the rotation of the reverse idler gear 320 is transmitted to the power output shaft 323 via the reverse gear 309. When the cogged clutch 308 is engaged with the reverse gear 309, the vehicle moves backward.

The automatic transmission 3 thus constituted is provided at the center of the car body 1 in the moving direction, as is shown in FIG. 4. In the drawing, reference number 2 denotes the engine, 4 denotes the main drive clutch, 5 denotes the shift select controller, 6 denotes the assist clutch, 7 denotes a hydraulic unit, and 8 denotes an indicator.

Next, the operation of the automatic transmission 3 will be explained.

First, when the driver turns on the starting switch in the state where the range lever is in the parking (P) position or in the neutral (N) position, the starter motor rotates and starts the engine 2. When the driver moves the range lever to the drive range (D) position after starting of the engine 2, the shift select controller 5 operates the actuator under the command from the range lever, and shifts the cogged clutch 305 connected to the power output shaft 323 to the rearward direction of the vehicle, in order to engage with the first gear 306. With the engagement of the cogged clutch 305 with the first gear 306, the cogged clutch 305, the first gear 306 and the counter first gear 318 are meshed.

At this point, the rotation of the power input shaft 300 is transmitted to the counter shaft 315 from the drive gear 301 via the counter drive gear 314 to rotate the counter shaft 315, and the rotation of the counter shaft 315 is transmitted to the first gear 306 via the counter first gear 318. The power output shaft 323 rotates with the rotation of the first gear 306, thereby rotating the wheels.

In the state where the cogged clutch 305 is shifted to the rearward direction of the vehicle to engage with the first gear 306, the power input shaft 300 is not rotating, so that the drive gear 301 fixed to the power input shaft 300 does not rotate. Therefore, the counter drive gear 314 fixed to the counter shaft 315 and meshed to the drive gear 301 does not rotate. Also, because the counter shaft 315 does not rotate, the counter first gear 318 fixed to the counter shaft 315 does not rotate.

When the driver operates the accelerator pedal, the main drive clutch 4 is gradually engaged, in order to start rotation of the power input shaft 300. The rotation of the power input shaft 300 rotates the drive gear 301, which is transmitted to the counter drive gear 314 meshed to the drive gear 301 so as to rotate the counter shaft 315. The rotation of the counter shaft 315 rotates the counter first gear 318, which is transmitted to the first gear 306, so as to rotate the power output shaft 323 engaged by the cogged clutch 305, thereby rotating the wheels.

When the driver depresses the accelerator pedal further, revolution of the engine and the car speed increases further. The accelerator command value corresponding to the amount of the accelerator pedal depressed is input to the control device, in order to decide whether the gear position is the first gear 306 or the second gear 304, from the accelerator command value and the car speed. When it is determined as being within the range of the second gear 304, a drive command is output from the control device to the shift select controller 5. The actuator operates based on the drive command of the shift select controller 5, to shift the cogged clutch 305 connected to the power output shaft 323 to the frontward direction of the vehicle to disengage the mesh with the first gear 306, and to further shift the cogged clutch 305 to the frontward direction of the vehicle to engage with the second gear 304. When changing from the first gear 306 to the second gear 304, the cogged clutch 305 becomes temporarily disengaged from either the first gear 306 or the second gear 304, between disengagement with the first gear 306 and the engagement with the second gear 304. At this point, the driver feels no acceleration being effected in spite of depressing the accelerator pedal, or even rather encounters a shock of temporary deceleration. The assist mechanism works to damp the shock of the driver during gear change.

The assist mechanism at gear change when the gear is switched operates as is shown in FIG. 5 through FIG. 7. The case where the gear is switched from the second gear 304 to the third gear 303 will be explained below as an example.

FIG. 5 shows the condition where the cogged clutch 305 is shifted to the frontward direction of the vehicle and engaged with the second gear 304.

The condition shown in FIG. 5 is the condition where the second gear 304 rotated by meshing with the counter second gear 317, which rotates together with the rotation of the counter shaft 315 and which is fixed to the counter shaft 315, is engaged with the power output shaft 323 by shifting the cogged clutch 305 to the frontward direction of the car body, so that the rotational force of the power input shaft 300 is transmitted to the power output shaft 323 via the counter second gear 317. That is, the rotational force of the power input shaft 300 is transmitted to the counter shaft 315 from the drive gear 301 via the counter drive gear 314 to rotate the counter shaft 315, and the rotation of the counter shaft 315 is transmitted with the speed changed via the counter second gear 317. At this point, the assist output gear 325 is rotated by the rotation of the power output shaft 323, and the assist gear 324 meshing with the assist output gear 325 is idling above the counter shaft 315 from the rotation of the counter assist gear 324.

In such state, the assist gear 324 meshing with the assist output gear 325 fixed to the power output shaft 323 is not engaged with the counter shaft 315, as is shown in FIG. 5. The assist gear 324 is rotating on the counter shaft 315 independently of the counter shaft 315, from the rotation of the power output shaft 323 via the assist output gear 325. The assist gear 324 is constantly idling above the counter shaft 315, as long as the power output shaft 323 is rotating, so that the rotational force transmitted to the power input shaft 300 from a fly wheel 330 via the main drive clutch 4 is not provided to the assist gear 324.

When the operation command for changing from the second gear 304 to the third gear 303 is output under such condition, the cogged clutch 305 is shifted to the rearward direction of the vehicle to disengage from the second gear 304, and the cogged clutch 302 is shifted to the rearward direction of the vehicle to engage with the third gear 303. When the gear change operation command is output, the command for operating the assist clutch 6 is output, so that the assist clutch 6 operates before the cogged clutch 305 disengages from the second gear 304, and engages with the assist gear 324 by pressing against the clutch plate 61 with hydraulic pressure, as is shown in FIG. 6. The engagement of the cogged clutch 305 and the second gear 304 is disengaged thereafter. With such operation, the rotation of the clutch plate 61 is transmitted to the assist output gear 325 via the assist gear 324. FIG. 6 shows the non-engaged condition where the cogged clutch 305 is disengaged from the second gear 304, and the cogged clutch 302 is also disengaged from the third gear 303.

With the rotation of the assist gear 324, the rotation of the counter shaft 315 is transmitted to the assist output gear 325 meshing with the assist gear 324. The clutch plate 61 engaged to the assist gear 324 is fixed to the counter shaft 315, so that the assist clutch 6 operates. When the clutch plate 61 and the assist gear 324 engages, the rotation of the clutch plate 61 rotated by the counter shaft 315 is transmitted to the assist output gear 325 meshing with the assist gear 324 via the assist gear 324, and is transmitted to the power output shaft 323 fixed with the assist output gear 325 via the assist output gear 325.

As is seen from above, even when the non-engaged condition where neither the second gear 304 nor the third gear 303 is engaged temporarily exists during transition from the second gear 304 to the third gear 303, the rotation transmitted to the power input shaft 300 from the fly wheel 330 via the main drive clutch 4 is transmitted from the drive gear 301 via the counter drive gear 314, the counter shaft 315, the clutch plate 61, the assist gear 324, the assist output gear 325, and the power output shaft 323, with the operation of the assist clutch 6. Therefore, obstructing of operation of the drive force to the power output shaft 323 during non-engaged condition at gear change could be prevented, relieving the shock at gear change.

After the assist mechanism performs assistance, the cogged clutch 302 is shifted to the rearward direction of the vehicle to engage with the third gear 303, and the assist clutch 6 operates to disengage the assist gear 324 from the clutch plate 61.

FIG. 7 shows the condition where the cogged clutch 305 is held at the neutral position, the cogged clutch 302 is engaged with the third gear 303, and the assist gear 324 and the clutch plate 61 is disengaged. As is shown in the drawing, when the cogged clutch 302 is engaged with the third gear 303, the rotation of the power input shaft 300 is transmitted to the counter shaft 315 from the drive gear 301 via the counter drive gear 314, and the rotation of the counter shaft 315 is transmitted to the third gear 303 via the counter third gear 316, and to the power output shaft 323 via the third gear 303 engaged with the power output shaft 323 by the cogged clutch 302.

When the driver attempts to increase the speed by depressing the accelerator pedal further, the revolution of the engine increases, and the increased revolution increases the rotation of the counter shaft 315 via the drive gear 301. When the speed of the vehicle (car speed) reaches the driving limit in third gear 303, the control device detects that the gear position is within the range of the fourth gear 301 (drive gear) from the accelerator command value and the car speed, and outputs the drive command from the control device to the shift select controller 5. By operating the actuator, the cogged clutch 302 connected to the power output shaft 323 is shifted to the frontward direction of the vehicle to disengage the mesh with the third gear 303, and the cogged clutch 302 is shifted further to the frontward direction of the vehicle to engage with the fourth gear 301 (drive gear). When the gear is changed from the third gear 303 to the fourth gear 301 (drive gear), the rotation of the power input shaft 300 is transmitted directly to the power output shaft 323 from the drive gear 301, so that the power output shaft 323 is rotated by the rotation of the power input shaft 300 itself.

When the gear is changed from the third gear 303 to the fourth gear 301, there temporarily exists a non-engaged condition where neither the third gear 303 nor the fourth gear 301 is connected with the power output shaft 323. Under the non-engaged condition, the driver feels no acceleration from depressing the accelerator pedal, and shock of temporary deceleration is caused during gear change. The assist clutch 6 operates in order to relieve the shock to the driver during gear change, as is mentioned above. The operation of the assist clutch 6 is the same as is mentioned above.

Likewise, when the gear is changed from the fourth gear 301 to the fifth gear 310, there temporarily exists a non-engaged condition where neither the fourth gear 301 nor the fifth gear 310 is connected with the power output shaft 323.

Under the non-engaged condition, the driver feels no acceleration from depressing the accelerator pedal, and shock of temporary deceleration is caused during gear change. The assist clutch 6 operates in order to relieve the shock of the driver during gear change, as is mentioned above. The operation of the assist clutch 6 is the same as is mentioned above.

When the driver slackens the accelerator pedal when the transmission gear is in the position of the third gear 303, the speed of the vehicle reduces, and car speed is slowed down. Then, the control device detects that the gear position entered the range of the second gear 302 from the range of the third gear 303 from the accelerator command value and the car speed, and outputs drive command from the control device to the shift select controller S. By operating the actuator, the cogged clutch 302 connected to the power output shaft 323 is shifted to the frontward direction of the vehicle to disengage the mesh with the third gear 303. At the same time, the cogged clutch 305 connected to the power output shaft 323 and in a position of non-engagement is shifted to the frontward direction of the vehicle to engage with the second gear 304. With the engagement of the cogged clutch 305 with the second gear 304, the cogged clutch 305, the second gear 304, and the counter second gear 317 are meshed.

Therefore, the rotation of the power input shaft 300 rotates the counter shaft 315 from the drive gear 301 via the counter drive gear 314, and the rotation of the counter shaft 315 is transmitted to the second gear 304 via the counter second gear 317. With the rotation of the second gear 304, the power output shaft 323 rotates in proportion to the second gear 304 with the rotation of the second gear 304, so that car speed is slowed down. When the speed of the vehicle is lowered from the slacking of the accelerator pedal by the driver, in the condition where the gear is the third gear 303, the gear change is performed under slow-down of the car speed so that there exists no shock from gear change, even when there occurs a temporary non-engaged condition during gear change from the third gear 303 to the second gear 304. Therefore, the assist mechanism does not perform assistance.

Also, during the gear change from the second gear 304 to the first gear 306, the speed of the vehicle is lowered by the slacking of the accelerator pedal by the driver, as is the case with the gear change from the third gear 303 to the second gear 304, so there exists no shock from gear change, even when there occurs a temporary non-engaged condition during gear change from the second gear 304 to the first gear 306. Therefore, the assist mechanism does not perform assistance.

The transmission theory of the present invention has been outlined heretofore. Next, controls over the automatic transmission of the present invention will be explained in detail.

Figure 8:
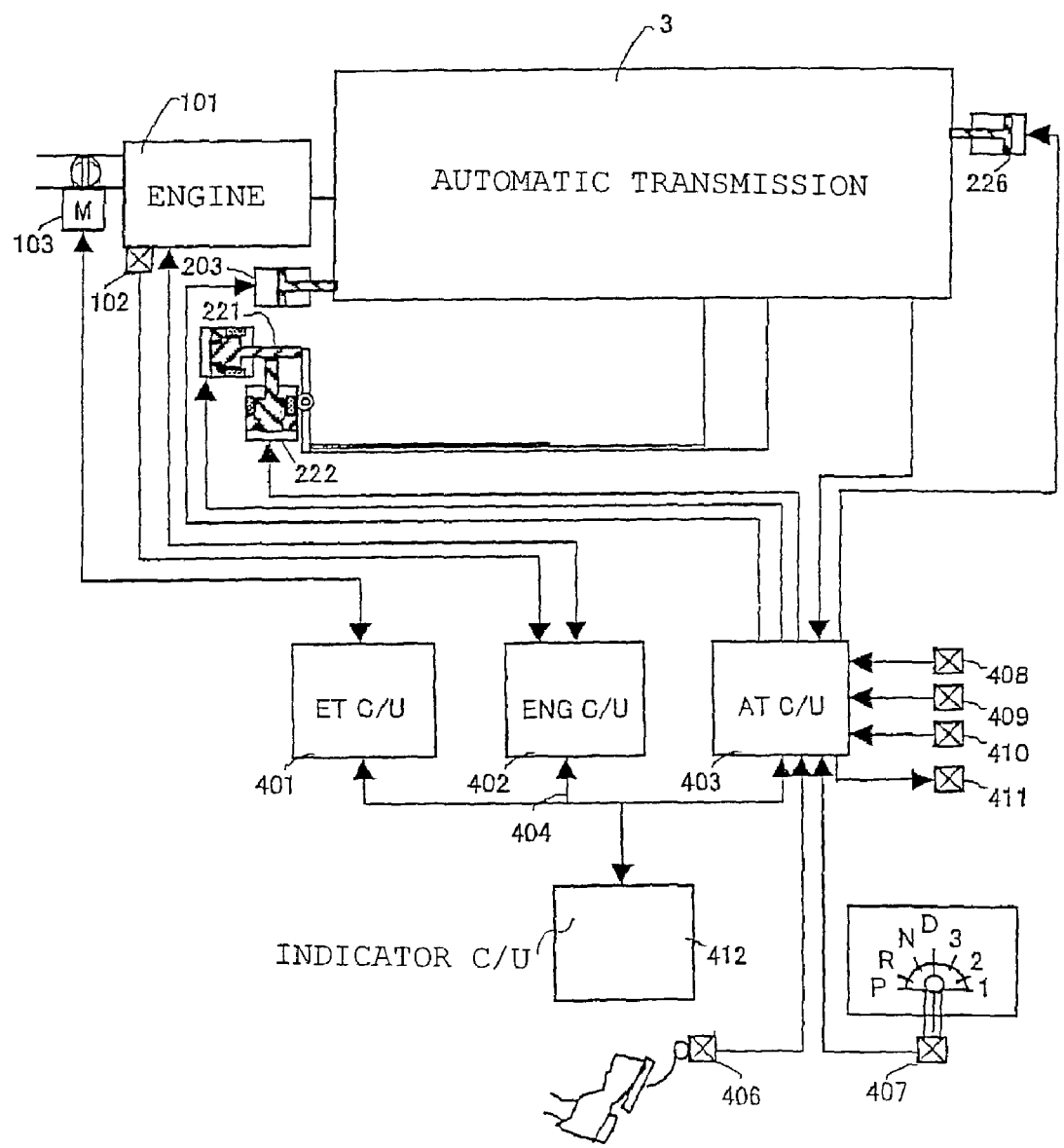
FIG. 8 depicts details of an exemplary overall structure of a vehicle employing the automatic transmission of the present invention.

FIG. 8 is a detailed depiction of an exemplary overall structure using the automatic transmission according to the present invention.

A control unit comprises an electronically controlled throttle control unit 401 used to control an electronically controlled throttle 103, an engine control unit 402 used to control an engine, a transmission control unit 403 controlling a gearbox, and an indicator control unit 412 adapted to provide the operator with the driving conditions and control statuses.

An engine 101 shares the electronically controlled throttle 103 to adjust engine torque and is comprised of various sensors including an engine sensor 102 for a detection of an engine rotation frequency, and various actuators. The engine 101 is under control of the engine control unit 402. The electronically controlled throttle 103 is under control of the electronically controlled throttle control unit 401.

The automatic transmission 3 places the actuators 203, 221, 222 and 226 under control of the transmission control unit 403.

The transmission control unit 403 receives automobile sensor signals from various sensors like an accelerator pedal sensor 406 for sensing the amount of depression of the accelerator pedal, an impedance switch 407 for detecting the position of a shift lever, a power output shaft revolution sensor 300 for detecting the rotation frequency of the power output shaft, a mode switch 408 switching the mode from automatic transmission to manual transmission and vice versa, an acceleration switch 408 used to shift the gear up by one stage during the manual transmission mode, a deceleration switch 410 used to shift the gear down by one stage during the manual transmission mode, and so forth. Various indicators such as a lamp 411 are added thereto. The transmission control unit 403 is connected to the engine control unit 402, the electronically controlled throttle control unit 401, and the indicator control unit 412 by communication bus 404 such as CAN (control area network).

The transmission control unit 403 determines states of the operation from the signals received to give adequate controls over the state of the clutch upon initial driving, the gear position, and so on. The transmission control unit 403 places the electronically controlled throttle 103 under control of the electronically controlled throttle control unit 401 to inhibit excessive puffing of the engine 101 in the course of gear shift during the automatic transmission mode. The transmission control unit 403 controls the electronically controlled throttle 103 and the assist clutch 6 for smooth transition of transmitted torque from immediately before the gear shift to immediately after the completion of the gear shift. In addition to that, a corrected value of ignition timing is sent from the transmission control unit 403 to the engine control unit 402 to optimize the ignition timing. The indicator control unit 412 enables various indications of the driving state and control conditions by means of letters and symbols on a display, vocal guidance, etc. Thereby, smooth driving with reduced shocks associated with gear shift is realized.

Figure 9:
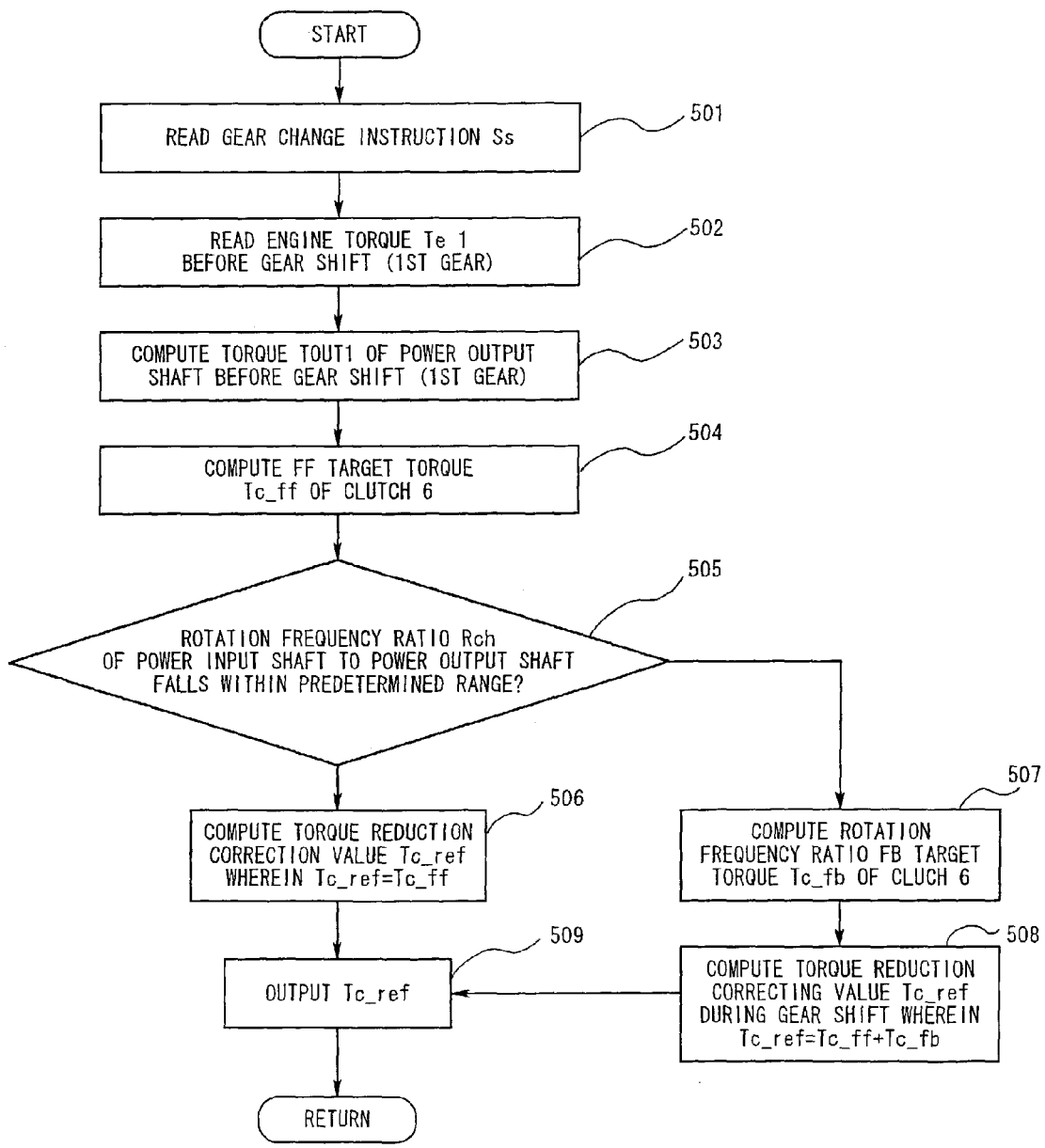
FIG. 9 is a flowchart illustrating commanded assist clutch transmission torque control during gear change.
Figure 10:
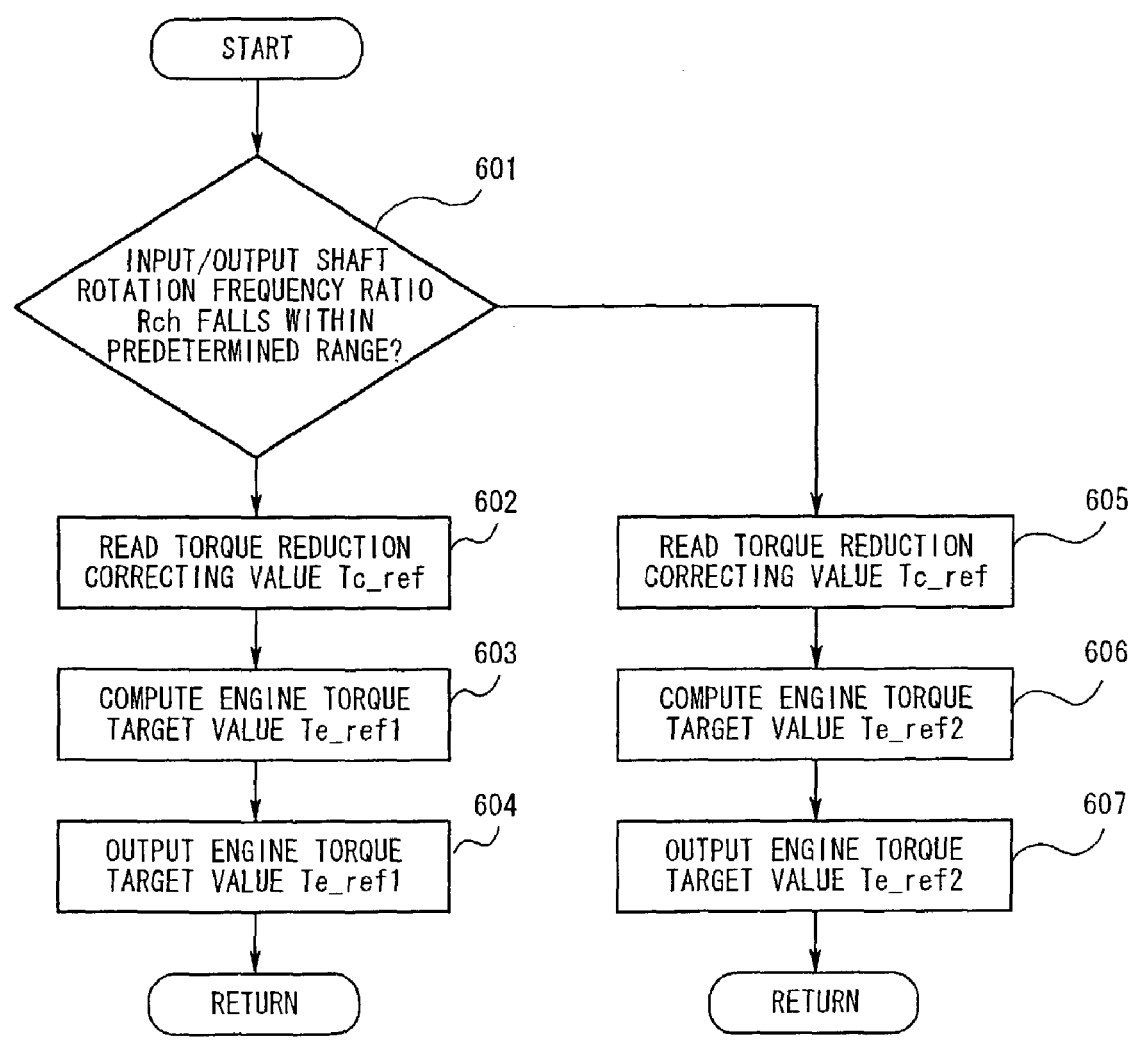
FIG. 10 is a flowchart illustrating arithmetic operation control for computing a control command for the engine.
Figure 11:
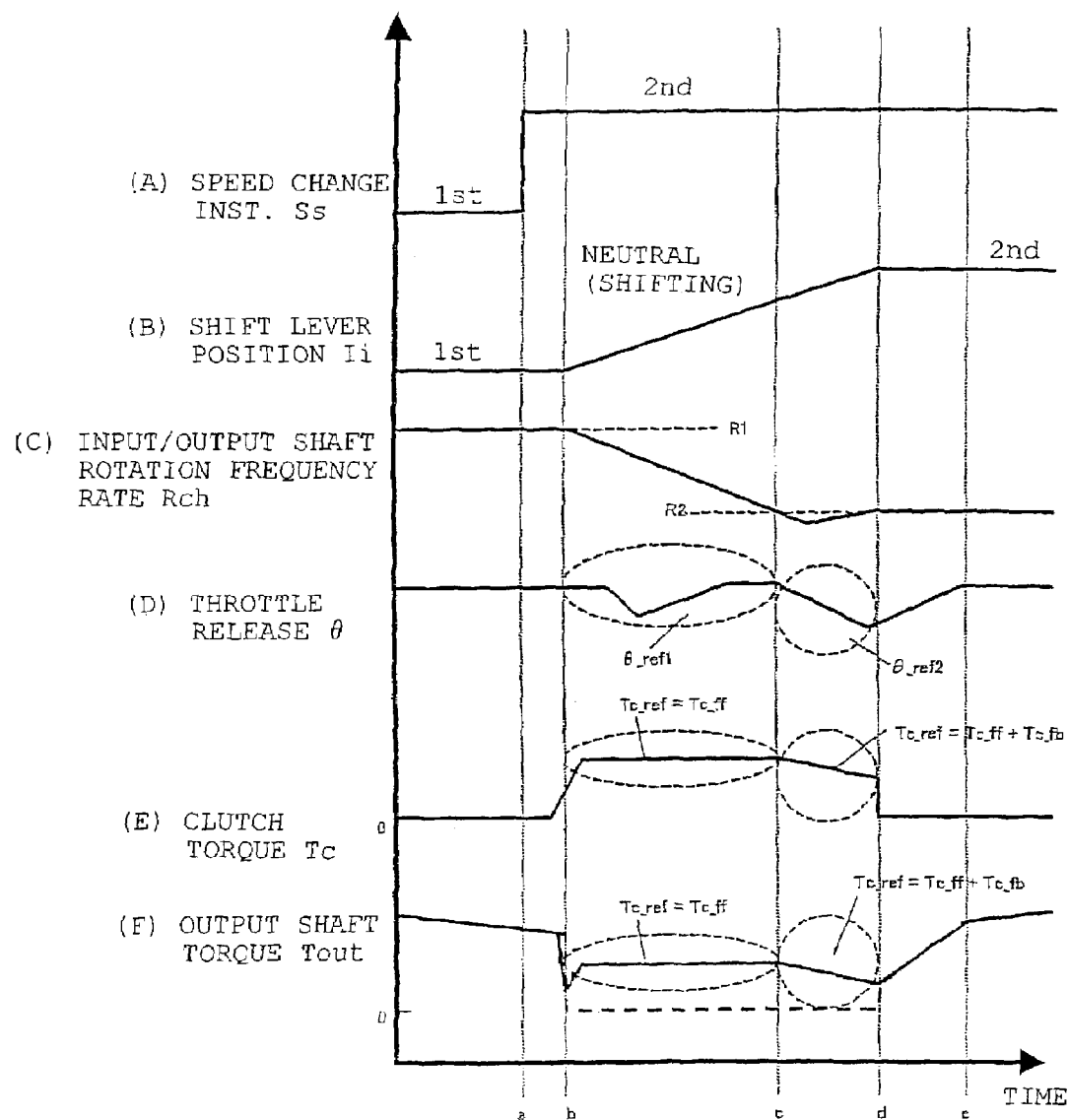
FIG. 11 is a timing chart illustrating a state of controls during gear change.

Referring now to FIGS. 9 to 11, a control method upon gear shift will be explained in a control system for a vehicle incorporated with the automatic transmission of this embodiment.

The control method follows and executes a program that is stored in a microcomputer built in the transmission control unit 403 and the like.

FIG. 9 is a flow chart illustrating a commanded assist clutch transmission torque control upon gear shift from the first gear to the second gear. The program starts with an interruption of a fixed interval (e.g., 10 ms) and executes a command sequence as follows:

Step 501 Read in a change-speed instruction Ss;

Step 502 Read in an engine torque Te1 before speed change (when maintaining the first gear);

Step 503 Compute a power output shaft torque Tout1 before gear change (at the first gear) from the engine torque Te1 read at Step 502;

Step 504 Based on the result of a computation of the power output torque Tout1 at Step 503, compute a FF (feed forward) target torque Tc_ff of the assist clutch 6. At this step, assuming that a transmission ratio for the first gear is R1, a transmission ratio for the second gear is R2, an engine rotation frequency before gear shift is Ne1, and an engine rotation frequency after gear shift to the second gear is Ne2, the engine rotation frequency after gear shift Ne2 is presumed as in the formula Ne2≈Ne1×(R2/R1). The engine torque after the gear shift depends upon the presumed engine rotation frequency Ne2 and the degree of throttle release (throttle opening), and this permits a power output shaft torque Tout2 after the gear shift to be similarly predicted. The FF target torque Tc_ff of the assist clutch 35 depends upon the prediction Tout2. Alternatively, the FF target torque Tc_ff of the assist clutch 35 may be continually computed from the detected engine rotation frequency Ne and the detected engine torque Te to satisfy a requirement of transmission period as specified for various driving situations. Also, alternatively, the FF target torque Tc_ff of the assist clutch 6 may be computed from torque components corresponding to the engine torque continually presumed or detected, and from inertia torque components required to reduce the engine rotation frequency in a predetermined period of time to some rotation frequency level determined by a gear ratio after the gear shift.

Step 505 Determine if a ratio Rch of the engine rotation frequency Ne (a power input shaft rotation frequency Nin) to the power output shaft rotation frequency No falls within a predetermined range. If not, the procedure advances to Step 506, or if so, the procedure advances to Step 507.

Step 506 In the course of the gear shift, when the power input/output rotation frequency ratio Rch does not fall within the predetermined range, a torque reduction correcting value Tc_ref is computed by a substitution as in the equation Tc_ref=Tc_ff.

Step 507 During shift, when the power input/output rotation frequency ratio Rch falls within the predetermined range, a frequency ratio FB (feedback) target torque Tc_fb of the assist clutch 6 is computed by feeding back a deviation of the power input/output shaft rotation frequency ratio Rch from the target rotation frequency ratio, which is equivalent to the transmission ratio for the second gear. Alternatively, the target engine rotation frequency (power input shaft rotation frequency) may be computed corresponding to the target rotation frequency ratio, and then the rotation frequency FB target torque Tc_fb of the assist cutch 6 may be computed by feeding back the engine rotation frequency Ne. Also, alternatively, the target rotation frequency (power input shaft rotation frequency) during gear shift may be computed by sequentially updating the gear ratio to bring about a smooth transition of the gear ratio between before and after the gear shift.

Step 508 Compute a commanded transmission torque Tc_ref of the assist clutch 6 during the gear shift by a substitution as in the equation Tc_ref=Tc_ff+Tc_fb.

Step 509 The commanded transmission torque Tc_ref of the assist clutch 6, which is respectively obtained at Step 506 and Step 508, is output as the target transmission torque of the assist clutch 6. From a value of the commanded transmission torque Tc_ref thus obtained, the actuator 226 adjust pressing force of the assist clutch 6 as required to optimize the transmission torque in the course of the gear shift.

Transmitting the torque to the power output shaft 223 with an intervention of the assist clutch 6 during the gear shift in such a manner enables transmission performance to enhance.

The control instruction to the engine 101 during the gear shift will be explained.

Control instruction follows and executes a program that is stored in a microcomputer built in the transmission control unit 403.

FIG. 10 is a flow chart illustrating controls over arithmetic operations on control instructions to the engine 101. The program starts with an interruption of a fixed time interval (e.g., 10 ms) and executes a command sequence.

Step 601 Determine if a rate Rch of the engine rotation frequency Ne (a power input shaft rotation frequency Nin) to the power output shaft rotation frequency No falls within a predetermined range. If not, execute torque control procedure 1 at Step 602, or if so, execute torque control procedure 2 at Step 603.

First, the contents of the procedure of the torque control 1 will be explained in Step 602 through Step 604 below.

Step 602 Read the value of the commanded transmission torque Tc_ref of the assist clutch 6, which is obtained based on the equation Tc_ref=Tc_ff.

Step 603 From the commanded transmission torque Tc_ref obtained at Step 602, compute an engine target torque Te_ref1 that achieves the engine rotation frequency Ne required to attain the predetermined power input/output shaft rotation frequency rate Rch.

Step 604 Output the engine target torque Te_ref1 obtained in Step 603 and transfer the engine target torque Te_ref1 thus produced to the electronically controlled throttle controller 401 through the CAN.

The electronically controlled throttle controller 401 regulates the electronically controlled throttle 103 so as to satisfy the required engine target torque Te_ref1.

In addition to that, in order to attain the engine target torque Te_ref1, an air-fuel ratio of the engine 101 may be adjusted, or otherwise, the ignition timing may be controlled.

As has been described, the controls over the power input shaft rotation frequency during the gear shift permits the cogged clutch to maintain engagement at the second gear, and the associated control over the inertia torque during the engagement with the second gear enables the transmission performance to enhance. Also, since the commanded transmission torque of the assist clutch 6 depends on the torque of the engine 101, such a variability of the transmission torque of the assist clutch 6 allows for adjustment of the power output shaft torque.

Next, the procedure for torque control 2 will be explained in Step 605 through Step 607.

Step 605 Read the commanded transmission torque Tc_ref of the assist clutch obtained based on the equation Tc_ref=Tc_ff+Tc_fb.

Step 606 From the commanded transmission torque Tc_ref obtained at Step 605, compute the engine target torque Te_ref2 that, after the gear shift, enables to reduce deviation of the power output shaft torque from the commanded transmission torque Tc_ref.

Step 607 Output the engine target torque Te_ref2 obtained at Step 606 and transfer the engine target torque Te_ref2 thus produced to the electronically controlled throttle controller 401 via the CAN.

The electronically controlled throttle controller 401 regulates the electronically controlled throttle 103 so as to satisfy the required engine target torque Te_ref2.

In addition to that, in order to attain the engine target torque Te_ref2, an air-fuel ratio of the engine 101 may be adjusted, or otherwise, the ignition timing may be controlled.

As has been described, the controls over the power input shaft rotation frequency at the end of the gear shift permits a reduction of a deviation of the power output shaft torque after the gear shift from the commanded torque of the assist clutch 6 during gear shift, and thus, a reduced instantaneous rise or drop of the torque enables the transmission performance to enhance.

Then, an operation during the gear shift from the first gear to the second gear will be described.

FIG. 11 is a timing chart illustrating varied states of controls throughout the gear shift. In FIG. 11, the speed change instruction Ss, the shift lever position Ii equivalent to the cogged clutch engagement position, the power input/output shaft rotation frequency rate Rch, the degree of throttle release θ, the torque Tc of the assist clutch 6, and the power output shaft torque Tout are respectively denoted at (A) through (F). The horizontal axis of the graph represents time.

As shown in FIG. 11(A), when the speed-change instruction Ss is at Point a while driving at first gear, gear shift to the second gear is started. Then, as can be seen in FIG. 11(E), the torque Tc of the assist clutch 6 gradually increases.

As the torque Tc of the assist clutch 6 rises, the torque Tout of the power output shaft gradually decreases, as shown in FIG. 11(F), and it is apparent that the cogged clutch that has been connected to the first gear is capable of disengagement at Point b.

When the cogged clutch is ready for release from the first gear engagement, the actuator 221 permits the cogged clutch to be released, and as can be seen in FIG. 11(B), the shift lever position Ii comes to Neutral (for shifting gear) and an actual gear shift is started.

With the shift lever position Ii in Neutral, as will be recognized in FIG. 11(E), a control over the assist clutch 6 is started to correct the torque reduction during the gear shift, and the actuator 226 is placed under control based on the target torque Tc_ref=Tc_ff of the assist clutch 6 that is obtained through the processing routine on the assist clutch transmission torque control command, so as to implement the optimized torque of the power output shaft in the course of the gear shift.

Since the torque transmitted from the assist clutch is realized as the power output shaft torque, it is preferable that the target torque Tc_ref of the assist clutch 6 has a smooth property so as to reduce discomfort of driver and passengers.

During the gear shift, the rotation frequency ratio Rch of the power input shaft to the power output shaft also needs to be shifted quickly and smoothly to the transmission ratio R2 for the second gear.

Thus, in order to attain the engine target torque Te_ref1 that is produced as a result of the procedure of the torque control 1, as shown in FIG. 11(D), the degree of throttle release θ is regulated to satisfy the requirement expressed as θ=θ_ref1 to perform the torque control over the engine 101. Consequently, the engine rotation frequency Ne is varied, and this causes the power input/output shaft rotation frequency ratio Rch to approximate the second gear transmission ratio R2.

The controls over the assist clutch 6 and the electronically controlled throttle 103 permit the power input/output shaft rotation frequency ratio Rch to reach a level as expressed in Rch=R2 at Point c, but in order to have an engagement of the cogged clutch, it is desirable that the engine rotation frequency Ne is regulated to increase while the rotation frequency rate Rch reaches the second gear transmission ratio R2. This is because, to cope with a problem that the engagement of the cogged clutch is interfered with the torque when the rotation frequency of the power input shaft tends to decrease whereas the rotation frequency of the power output shaft No is increased due to the commanded transmission torque of the assist clutch 6 determined through the arithmetic operation during the gear shift, the rotation frequency of the power input shaft is managed to increase so that the engagement of the cogged clutch undergoes less interference with the torque.

Beyond Point c where Rch<R2, the rotation frequency rate Rch must be increased. Immediately before the engagement of the cogged clutch (i.e., between Point c to Point d), however, there arises a slight response delay to the control over the engine torque Te, and therefore, it is desirable that the rotation frequency rate Rch is adjusted by varying the torque of the assist clutch 6. Thus, during a period from Point c to Point d, the target torque of the assist clutch 6 is added by the rotation frequency ratio FB target torque Tc_fb of the assist clutch 6 that depends on the deviation of the rotation frequency ratio Rch from the second gear transmission ratio to the initial target torque of the assist clutch 6, so as to be expressed in the equation Tc_ref=Tc_ff+Tc_fb.

In this way, by feeding back the rotation frequency ratio only during a period of time when the deviation of the rotation frequency ratio Rch from the second gear transmission ratio R2 is relatively small, a variation in the commanded transmission torque during the gear shift can be minimized, and the driver and passengers can experience a more confortable ride. Such a rotation frequency ratio FB control over the assist clutch 6 brings about an optimized condition as expressed in Rch≈R2 where the rotation frequency Rch keeps increased, and this permits the engagement of the cogged clutch to the second-shift gear.

When the cogged clutch is capable of second gear engagement, the actuator 221 is placed under control to effect the engagement of the cogged clutch to the second gear. At this point of time, however, it is desirable to minimize the deviation of the torque of the power output shaft after the gear shift (i.e., after connected to the second gear) from the commanded transmission torque of the assist clutch 6 in the course of the gear shift so as to reduce the instantaneous rise or drop of the torque of the power output shaft at the end of the transmission.

Although the commanded transmission torque during the gear shift depends on the torque Tc of the assist clutch 6 while the same torque after the gear shift depends on the engine torque Te and the second gear transmission ratio R2, it is necessary that, during Point c and Point d, the throttle opening is adjusted as expressed in the equation θ=θ_ref2 to attain the engine target torque Te_ref2. During the gear shift, the assist clutch 6 is loose, and when the engine 101 has its torque Te higher than its predetermined level, the commanded transmission torque during the gear shift depends on the torque Tc of the assist clutch 6. Hence, the torque adjustment after the gear shift can be independent of the transmission torque controls over the assist clutch that is carried out during the gear shift.

After the second gear engagement of the cogged clutch at Point d and once the speed change is practically completed, the throttle opening θ is returned to its initial position prior to the gear shift, and the transmission control is terminated at Point e.

As stated above, in this embodiment, the torque reduction correcting value of the power output shaft is computed during the gear shift, and from the resultant correcting value, the rotation frequency of the power input shaft is controlled and the torque of the power input shaft is adjusted at the end of the gear shift, thereby retraining a variation in the torque of the power output shaft.

According to the embodiment of the present invention, the assist clutch 6 assists the rotation to the power output shaft 323 under the non-engaged condition during gear change from the first gear to the second gear, from the second gear to the third gear, from the third gear to the fourth gear, and from the fourth gear to the fifth gear, so that the accelerating power is transmitted to the power output shaft 323 during accelerated but non-engaged condition, resulting in moderating the shock the driver feels as if the vehicle is decelerated. That is, even when a mesh-type transmission provided with a clutch for engaging and disengaging the transmission gear and the power output shaft is used, the shock originated from engagement and disengagement of the clutch during acceleration could be relieved.

Also, according to the present embodiment, a mesh-type transmission for transmitting power of the power input shaft 300 to the power output shaft 323 by engaging the plurality of cogged clutches 302, 305, 308 with the plurality of transmission gears 301, 303, 304, 306, 310 is used, and the automatic transmission, which performs automatic gear change by controlling engagement of the plurality of cogged clutches 302, 305, 308 for engaging and disengaging the voluntary transmission gears 301, 303, 304, 306, 310 with the power output shaft 323 to the transmission gear determined from the accelerator command value and the car speed, is provided with the assist mechanism for transmitting rotational force of the power input shaft 300 to the power output shaft 323, when no cogged clutch is engaged with any of above-mentioned plurality of transmission gears during switching of the cogged clutch. Therefore, the shock originated from engaging and disengaging of the clutch during acceleration could be relieved.

Moreover, according to the present embodiment, a mesh-type automatic transmission equipped with the plurality of transmission gears 301, 303, 304, 306, 310 provided so as to rotate freely to the power output shaft 323 for providing driving force to the wheels, the plurality of cogged clutches 302, 304, 308 connecting with the power output shaft 323, and the plurality of counter transmission gears 314, 316, 317, 318, 322 corresponding to each speed, which are fixed to the counter shaft 315 rotated by the rotation of the power input shaft 300 rotated from the power of the engine 2, and which mesh with the plurality of transmission gears 301, 303, 304, 306, 310, for performing automatic gear change by controlling engagement of the plurality of cogged clutches 302, 305, 308 with the voluntary gears 301, 303, 304, 306, 310 of the plurality of gears 301, 303, 304, 306, 310 determined from the accelerator command value and the car speed, is used. The automatic transmission is provided with the assist mechanism for assisting transmission of the rotational force of the power input shaft 300 to the power output shaft 323 via the assist gear 324 which rotates from the rotation of the counter shaft 315, during non-engagement when no cogged clutch of the plurality of cogged clutches 302, 305, 308 is engaged with any of the plurality of gears 301, 303, 304, 306, 310, occurring during switching when an engaged cogged clutch of the plurality of cogged clutches 302, 305, 308 is disengaged and one of the cogged clutch of the plurality of cogged clutches 302, 305, 308 is to be engaged. Therefore, during non-engagement when the cogged clutch and the transmission gear is disengaged during switching of the transmission gear, the rotation of the power input shaft 300 (counter shaft 315) could be assisted to the power output shaft 323, so that shock originated by engaging and disengaging of clutch during acceleration could be relieved, even when a mesh-type transmission provided with clutches for engaging and disengaging the gears 301, 303, 304, 306, 310 with the power output shaft 323 is used.

Furthermore, according to the present embodiment, the position for providing the counter shaft 315 is formed so as to be positioned below the horizontal plane including the central axis of the power output shaft 323, so that the assist mechanism could be provided to the lowermost portion of the transmission case 30, enabling effective use of the interior space of the transmission case, as well as enabling expectance for cooling effect from the oil. Moreover, the assist mechanism could be mounted to a position without obstructing the access to the gear oil injection hole.

Still further, according to the present embodiment, the assist clutch 6 is provided to the side end portion of the counter shaft 315 at the rearward side of the car body, so that the assist clutch 6 could be mounted to position with ease when abnormality occurs to the assist clutch 6, and repairing, replacing and the like of the assist clutch 6 is facilitated.

Still further, by mounting the assist clutch 6 to the counter shaft 315, the size of the transmission case 30 could be reduced, and the structure of the automatic transmission 3 could be miniaturized.

As has been recognized in the aforementioned embodiment, the torque transmission cooperatively carried out by the assist gear 324, the assist output gear 325, and the assist clutch 6 can effectively relieve the shock that occurs during gear shift caused by engagement and disengagement of the cogged clutches 302, 305, and 308. The torque transmitted to the power output shaft 323 during the gear shift depends on the assist clutch 6, the assist gear 324, and the assist output gear 325. Thus, for practical selection and incorporation into the gear box, the assist gear 324 and the assist output gear 325 must be appropriately examined in view of performance and durability. Selections of the assist gear 324 and the assist output gear 325 will be described below.

FIGS. 12 to 16 shows key properties utilized to select gears of the assist gear 324 and the assist output gear 325 according to the present invention. Selection parameters for the gears can be expressed by a gear ratio of the assist gear 324 to the assist output gear 325. A transmission gear ratio among the power input shaft 300, the counter shaft 315, and the power output shaft 323 incorporated in the transmission can be expressed by a product of a gear ratio of the drive gear 301 of the power input shaft 300 to the counter drive gear 314 of the counter shaft 315, multiplied by a gear ratio of the gears of the counter shaft 315 (the counter third-shift gear 316, the counter second-shift gear 317, the counter first-shift gear 318, and the counter fifth-shift gear 322) to the gears of the power output shaft 323 (the third-shift gear 303, the second-shift gear 304, the first-shift gear 306, and the fifth-shift gear 310).

In contrast to an ordinary transmission gear ratio, we will now explain a method of selecting the assist gear 324 and the assist output gear 325 where a gear ratio (referred to as "assist gear ratio" hereinafter) is a product of a gear ratio of the assist gear 324 to the assist output gear 325 multiplied by a gear ratio of the drive gear 301 to the counter drive gear 314.

The assist gear ratio affects torque transmitted from the power input shaft 300 to the power output shaft 323 during the gear shift as well as a differential rotation frequency between the input and output of the assist clutch 6 used to transmit the torque, and hence, transmission properties in relation with the assist clutch such as a transmission enabled zone, transmission performance, durability, and the like vary depending on the assist gear ratio. In this sense, the determination of the assist gear ratio is a critical matter.

Figure 12:
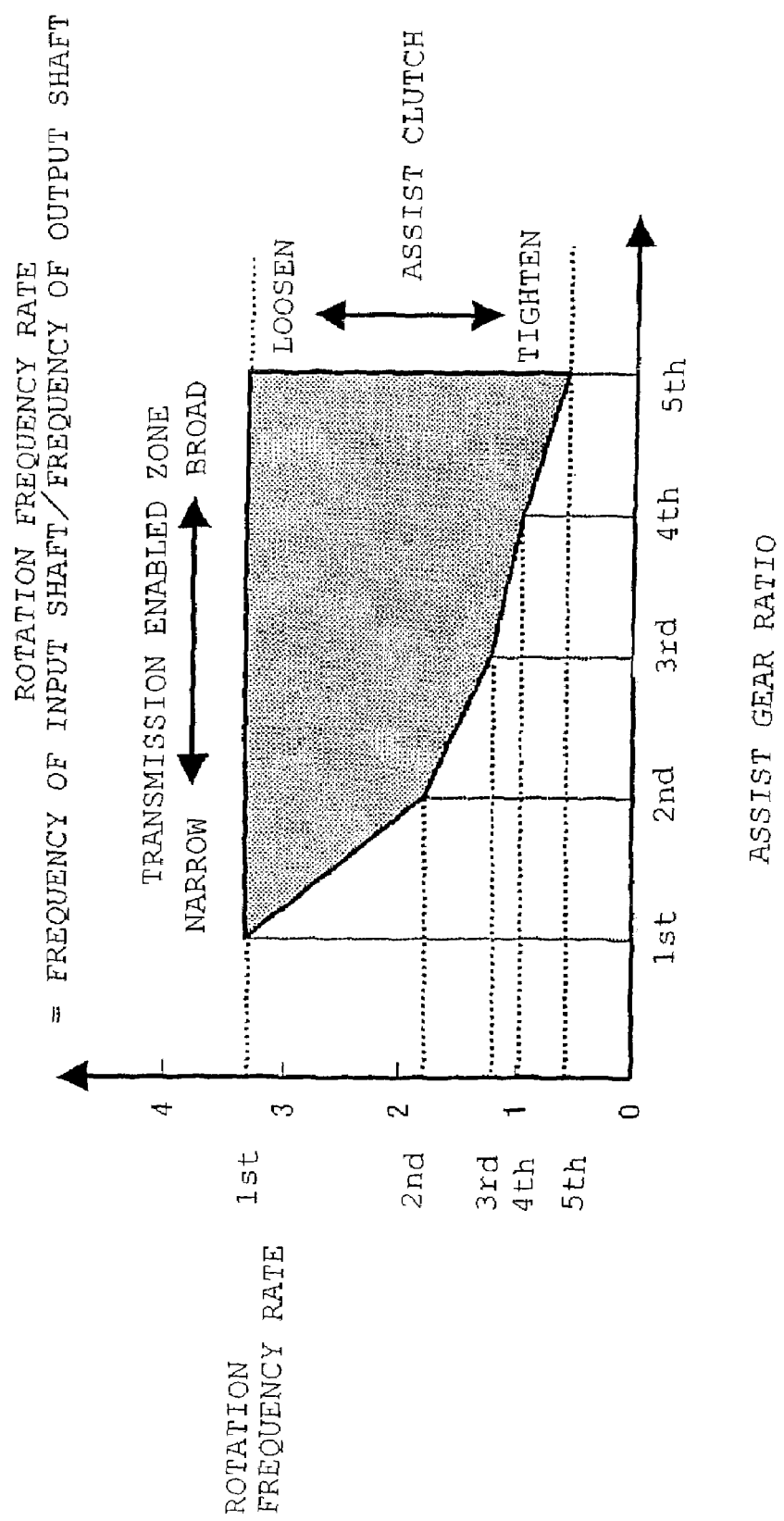
FIG. 12 is a diagram illustrating the relation between an assist gear ratio and a transmission enabled zone.

FIG. 12 shows a relation between the assist gear ratio with the transmission enabled zone. The vertical axis represents a rotation frequency ratio (a ratio between a rotation frequency of the power input shaft 300 to a rotation frequency of the power output shaft 323) while the horizontal axis represents the assist gear ratio. The gear ratio is assumed herein as 3.321 for the first gear, 1.902 for the second gear, 1.308 for the third gear, 1.000 for the fourth gear, and 9.759 for the fifth gear. As stated above, engagement force of the assist clutch 6 is controlled during the gear shift, and the transmission is effected after raising or dropping the rotation frequency ratio from the power input shaft 300 to the power output shaft 323 to correspond to the target gear ratio. Thus, once specifying the assist gear ratio for the third gear, gearshift using the assist clutch 6 is limited to those from first to second, from first to third, and from second to third since the rotation frequency ratio of the power input shaft 300 to the power output shaft 323 cannot be smaller than the gear ratio for the third gear.

On the other hand, once specifying the assist gear ratio for the fifth gear, gearshift using the assist clutch 6 is applicable to all up-shifts from first through fifth. As will be recognized, the transmission enabled zone is confined within the limits of the assist gear ratio.

Taking the torque transmitted to the power output shaft 323 into consideration, before the gear shift, transmission of the engine torque to the power output shaft 323 is performed relying on a gear ratio of a specified gear to which the cogged clutches 302, 305, and 308 are engaged. After starting the gear shift, when the cogged clutches 302, 305, and 308 are released, the engine torque is transmitted to the power output shaft 323 due to the assist gear ratio. Thus, at the start and end of the gear shift, there arises an instantaneous rise and drop of the torque that depends on the difference between the gear rate of the specified gear before and after the gear shift and the assist gear ratio.

Thus, when the assist gear ratio is set equal to a small gear ratio for the fastest gear, the power output shaft 323 during the gear shift is reduced in torque to produce a large variation from the torque after the gear shift, which causes the shock due to transmission. This torque variation of the power output shaft 323 is called "differential torque".

Figure 13:
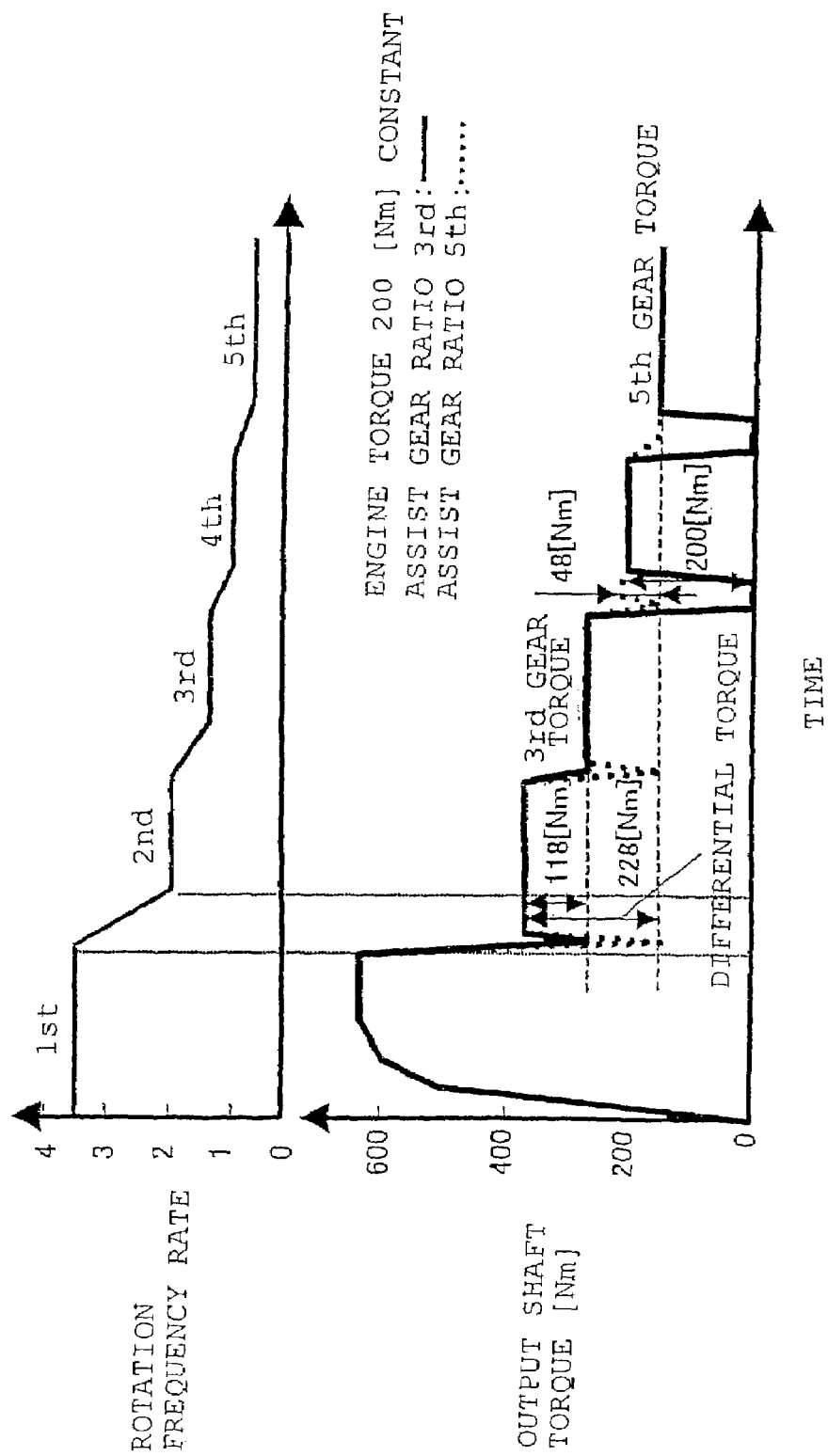
FIG. 13 is a diagram illustrating the relation between the assist gear ratio and a power output shaft torque.

FIG. 13 shows a relation of the assist gear ratio with the torque of the power output shaft 323. The upper vertical axis represents a rotation frequency ratio while the lower vertical axis represents a torque of the power output shaft 323, and the horizontal axis represents the rotation frequency ratio and the torque of the power output shaft 323 when the gear is shifted from the first gear to the fifth gear. Solid line denotes the torque of the power output shaft 323 when the assist gear ratio is equivalent to the gear ratio for the third gear while broken line denotes the torque of the power output shaft 323 when the assist gear ratio is equivalent to the gear ratio for the fifth gear. The engine torque is constant at 200 [Nm]. During the gear shift from first to second, the differential torque is 118 [Nm] with the assist gear ratio equivalent to the gear rate for the third gear, which is 228 [Nm] with the assist gear ratio equivalent to the gear ratio for the fifth gear. During the gear shift from third to fourth, since there arises no torque transmission by the assist clutch 6 with the assist gear ratio equivalent to the third gear, the differential torque is 200 [Nm], which is 48 [Nm] with the assist gear ratio equivalent to the fifth gear. In general, although the driver and passengers encounter almost no unpleasantness when the vehicle acceleration rate is around 0.1 [G], they experience unpleasantness when the acceleration rate equals 0.2 [G] or more. Since 100 [Nm] is almost equal to the 0.1 [G] vehicle acceleration rate, the differential torque is desirably 100 [Nm] or less. As has been recognized, the assist gear ratio should not be reduced too much to restrain the shock due to the transmission.

Figure 14:
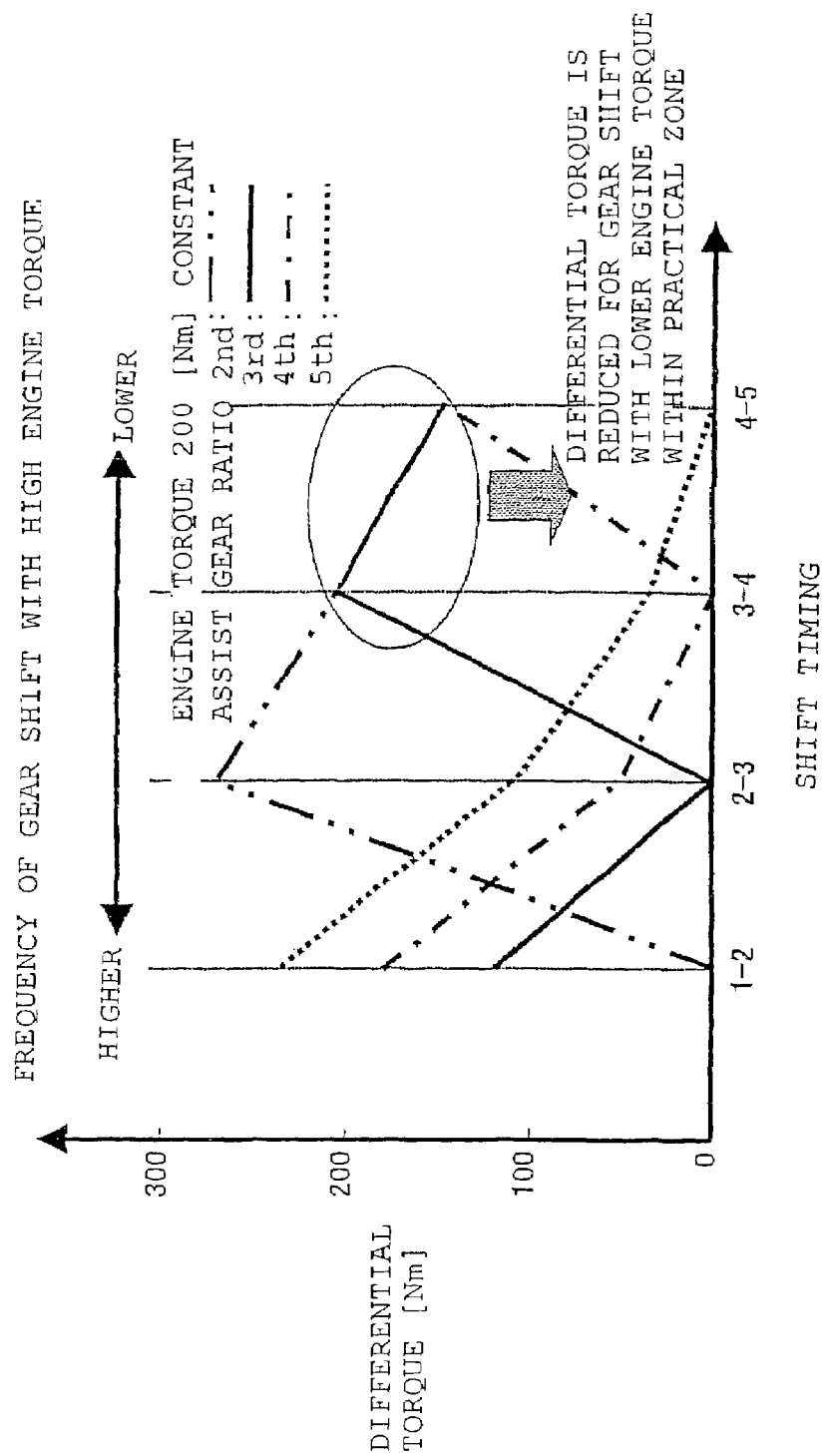
FIG. 14 is a diagram illustrating the relation between the assist gear ratio and a differential torque.

FIG. 14 shows the relation of the gears and the differential torque with the varied assist gear ratio. The vertical axis represents the differential torque while the horizontal axis represents timing of gear shift. Two-dot chain line, solid line, chained line, and broken line respectively denote the differential torques with the assist gear ratio equivalent to the gear ratio for the second, third, fourth, and fifth gears, respectively. The engine torque is constantly 200 [Nm]. With any level of the assist gear ratio, there necessarily is a peak of the differential torque. When translated into the practical zone, the gear shift at a high engine torque reaching 200 [Nm] occurs frequently during transition from the first to the second and from the second to the third, but it almost does not occur from the third to the fourth nor from the fourth to the fifth. Gear shift from the third to the fourth and from the fourth to the fifth is often performed with a low engine torque. This means that the differential torque for the gear shift from the third to the fourth and from the fourth to the fifth is smaller in the practical zone. In other words, the differential torque for the velocity shift from the first to the second and from the second to the third is important. During the gear shift from the first to the second, the differential torque becomes greater with the assist gear ratio for the fourth and fifth gears, resulting in a poor transmission performance, and therefore, it is preferred that the assist gear ratio is kept larger than that equivalent to the gear ratio for the second gear but smaller than that equivalent to the gear ratio for the fourth gear. However, with the assist gear ratio smaller than that equivalent to the gear ratio for the third gear (e.g., with the assist gear ratio equivalent to the second gear ratio), the gear shift from second to third is inadequate to the torque transmission by the assist clutch 6, resulting in a poor transmission performance. Thus, to attain a satisfactory transmission performance, it is preferred to use the assist gear ratio greater than the third gear rate but smaller than the fourth gear ratio.

Figure 15:
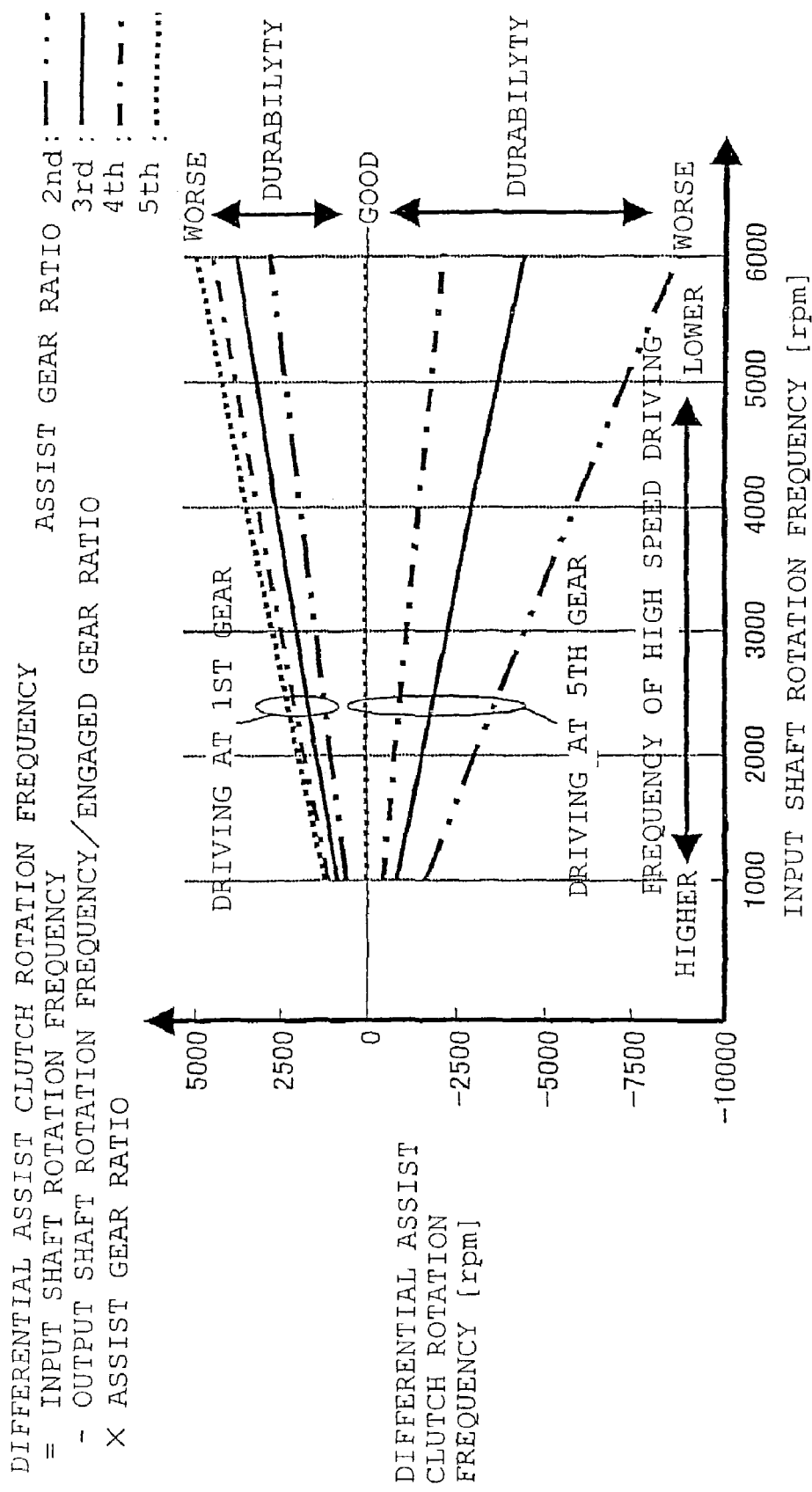
FIG. 15 is a diagram illustrating the relation between the assist gear ratio and a differential rotation frequency of an assist clutch.

FIG. 15 shows the relation between the assist gear ratio and the differential assist clutch rotation frequency. The vertical axis represents the differential assist clutch rotation frequency while the horizontal axis represents the rotation frequency of the power input axis 300. Provided that two-dot chain line, solid line, chained line, and broken line respectively denote the differential assist clutch rotation frequency with the assist gear ratio equivalent to the gear ratio for the second, third, fourth, and fifth gears, respectively, the driving at the first and fifth gears are simulated. In this simulation, the differential assist clutch rotation frequency is a variation in the rotation frequency from an input to an output of the assist clutch during the driving at the fixed gear without gearshift, which is calculated by the following formula:

$$\text{(Rotation frequency of the power input shaft 300)} - \text{(Rotation frequency of the power output shaft 323/Engaged Gear Ratio)} \times \text{(Assist Gear Ratio)}.$$

A large amount of this variation may cause friction of the assist clutch and hence deteriorate the durability thereof. Driving at the first gear permits driving throughout the zones covering the lowest rotation frequency of the power input shaft to the highest thereof. Durability would be impaired when the power input shaft 300 rotates at a higher rate with the assist gear ratio equivalent to the gear ratio for the fourth and fifth gears. The rotation frequency of the power input shaft 300 during driving at the fifth gear would hardly exceed 4000 [rpm], but instead, the differential assist clutch rotation frequency almost reaches −6000 [rpm] with the assist gear ratio equivalent to the gear ratio for the second gear, which adversely affects the durability of the assist clutch. As the assist gear ratio is reduced, the frequency of using the assist clutch is decreased, and hence, its durability is not impaired.

Simulation and analysis results are shown in FIG. 16. Although the assist gear ratio is advantageously equivalent to the gear rate for the higher gear for the transmission enabled zone, a contemplation of the transmission performance and durability of the assist clutch draws a more preferable conclusion that the assist gear ratio should be equivalent to the third gear ratio.

The assist gear ratio can be set equivalent to the third gear ratio. Alternatively, the assist gear ratio may be smaller than the third gear ratio; e.g., it may take an intermediate value between the third and fourth gear ratios. In such a case, it becomes possible that a rotation frequency ratio of the power input shaft 300 to the power output shaft 323 is smaller than the third gear ratio during the gear shift from second to third, and the transmission can attain the same level of transmission performance as it would during the gear shift from the first to the second.

With the assist gear ratio equivalent to the third gear, the assist clutch may also serve as a fail-safe mechanism where it enables the vehicle to start at the third gear position when a driveaway clutch is broken.

Although the exemplary settings of the assist gear ratio have been described in the transmission with five gears, the similar concept can apply to any transmission having less than five gears or more than six gears.

Figure 17:
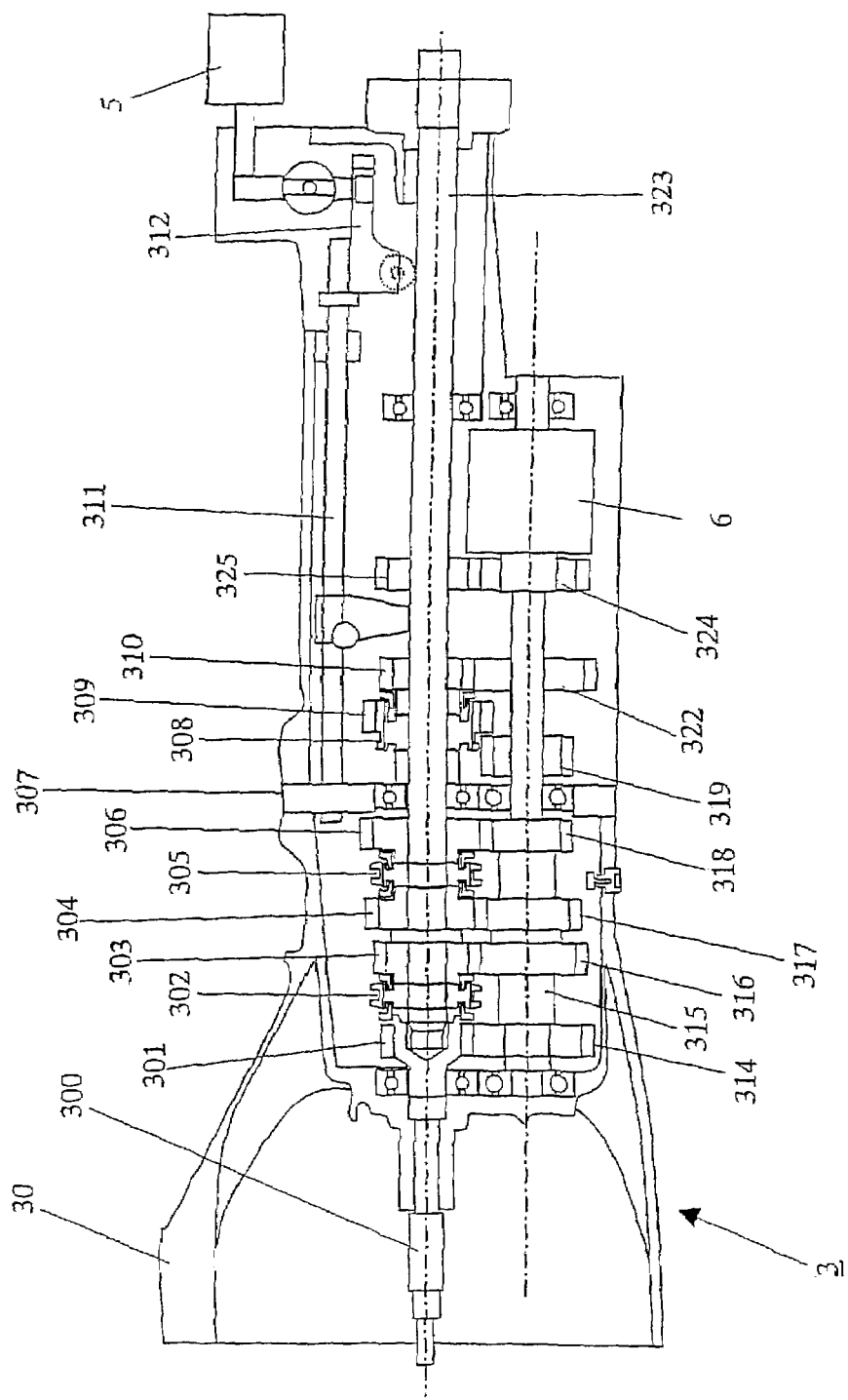
FIG. 17 shows an embodiment of the overall structure of the automatic transmission of the present invention with the reference assist gear ratio at the third gear.

FIG. 17 depicts a case of a five gear transmission, showing a structure of the transmitter using the assist gear ratio equivalent to the third gear ratio. In FIG. 17, the assist gear 324, the assist output gear 325, the drive gear 301 and the counter drive gear 314 are cooperatively configured to attain the third gear ratio. Alternatively, it is also possible that the assist gear 324 and the assist output gear 325 are configured to attain an intermediate gear ratio between the third and fourth gear ratios. In FIG. 17, although the assist gear 324, the assist output gear 325 and the assist clutch 6 are cooperatively transmitting the torque from the power input shaft 300 to the power output shaft 323, the cogged clutch 320, when responding to the assist gear ratio equivalent to the third gear in the ordinary driving at the third gear, causes the third gear 303 to be engaged with the power output shaft 323, and then the counter third gear 316 and the third gear 303 are joined to perform the driving at the third gear without using the assist clutch 6 in any task other than the torque transmission during the gear shift, which is advantageous in enhancing the durability of the clutch. When the cogged clutch for engaging the third gear 303 with the power output shaft 323 is broken, the assist clutch 6 can be used in substitution for the third gear to implement the third gear driving.

Figure 18:
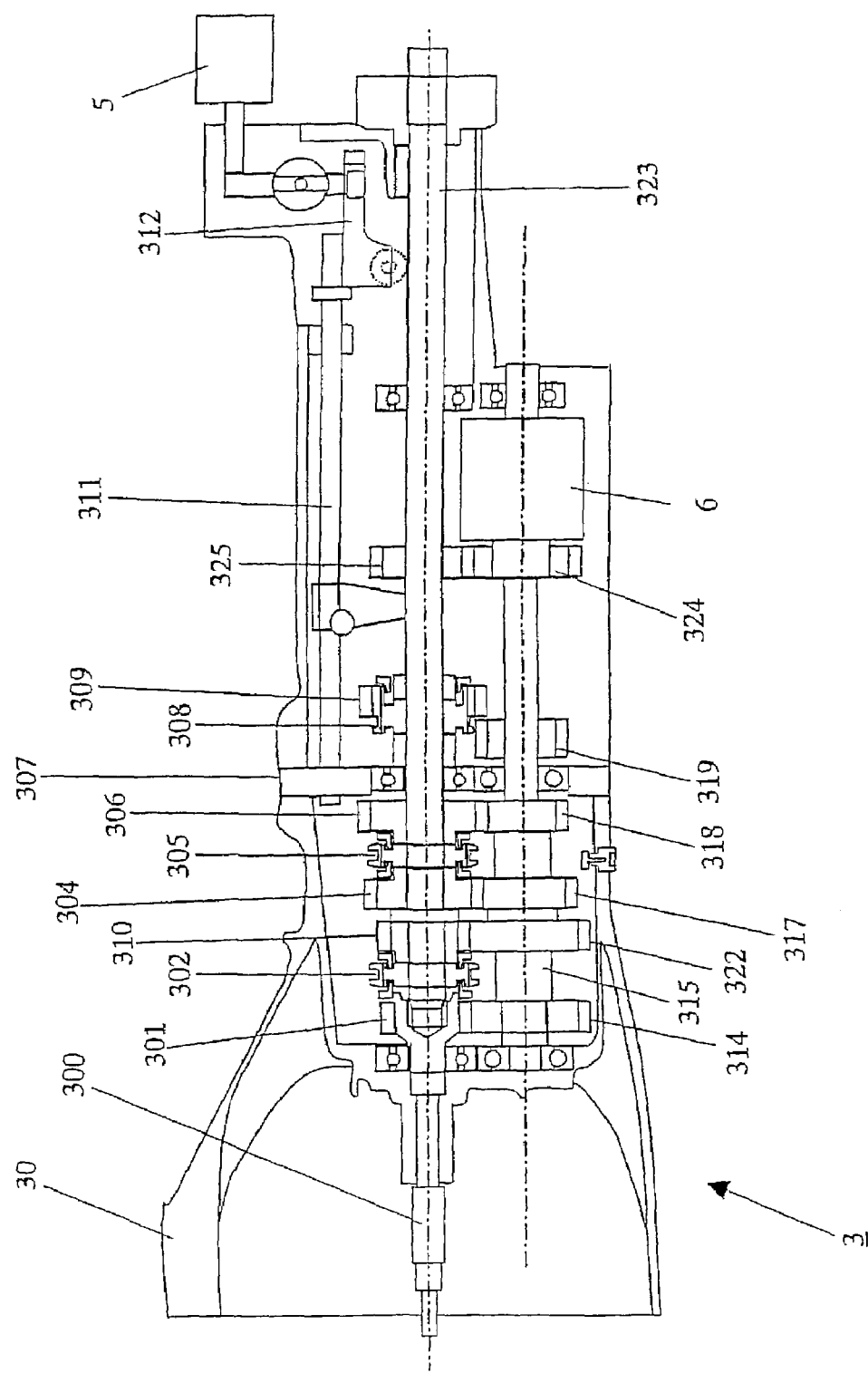
FIG. 18 shows another embodiment of the overall structure of the automatic transmission of the present invention with the reference assist gear ratio at the third gear.

FIG. 18 is a diagram showing another exemplary structure of the five-gear transmission used with the assist gear ratio equivalent to the third gear ratio. In FIG. 18, the assist gear 324, the assist output gear 325, the drive gear 301 and the counter drive gear 314 are cooperatively configured to attain the third gear ratio. In this embodiment, the fifth gear is removed from the location taught in the embodiment of FIG. 17, and instead it is located in the position where the third gear lies in FIG. 17.

In the arrangement of FIG. 18, the assist clutch 6 may be used for any task other than the torque transmission during the gear shift; that is, it may be completely engaged during third gear drive to cause the assist gear 324 and the assist output gear 325 to join and implement the third gear driving. The assist gear can be commonly used as an ordinary driving gear as can be seen in FIG. 18, and thus, the number of the gears in the transmission can be reduced.

APPLICABILITY IN THE INDUSTRY

As has been mentioned above, a structure and mechanism according to the present invention relieves the shock caused by the clutch being engaged and disengaged during acceleration.

We claim:

1. A mesh-type automatic transmission, comprising a power input shaft for introducing engine power, a plurality of transmission gears, a plurality of cogged clutches, a power output shaft for outputting driving force, a counter shaft, and a plurality of counter gears for transmitting the engine power to said power output shaft by rotating said power input shaft via the engine power, rotating said counter shaft by rotation of said power input shaft, and transmitting rotation of said counter shaft to said power output shaft via said counter gear automatically by engaging and disengaging said cogged clutch to one of said transmission gears corresponding to speed; wherein said counter shaft is provided with an assist mechanism for transmitting rotational force of said power input shaft to said power output shaft by transmitting rotation of said counter shaft via said assist mechanism during a gear change from the time of disengagement of a gear to the engagement of a new gear, said assist mechanism including an assist clutch having an assist counter shaft, an assist gear associated and rotatable with said assist counter shaft, and an assist output gear operatively associated with the power output shaft, wherein said assist mechanism starts engaging when a switch command of said cogged clutch is output before said cogged clutch currently engaged with said transmission gear is completely disengaged, transmits the rotational force of said power input shaft to said power output shaft by being engaged corresponding to the torque of the engine when said cogged clutch is completely disengaged from said engaged transmission gear, and disengages when said cogged clutch is engaged with said transmission gear to be engaged based on said switch command.

2. An automatic transmission according to claim 1, wherein said assist mechanism is provided to the lateral rear end portion of said counter shaft in a car body.

3. An automatic transmission according to claim 2, wherein said assist mechanism is provided below a horizontal plane where a center axis of said power output shaft lies.

4. A mesh-type automatic transmission equipped with a power input shaft for introducing power of an engine, a power output shaft for outputting the driving force of the transmission, a counter shaft receiving the driving force that is transmitted from the power input shaft through a series of power input gears, a series of power output gears disposed between the counter shaft and the power output shaft, and cogged clutches provided between the series of power output gears and the power input shaft and between those power output gears and the power output shaft, the power of the engine being transmitted from the power input shaft to the power output shaft by the engagement and disengagement of the cogged clutches,
- wherein the automatic transmission comprises an assist mechanism, the assist mechanism including
- an assist counter gear that is provided on the counter shaft and adapted for idling rotation,
- an assist output gear meshed with the assist counter gear and fixed to the power output shaft, and
- a friction clutch that is provided between the assist counter gear and the counter shaft to transmit the driving force from the counter shaft to the power output shaft via the assist counter gear and the assist output gear while the cogged clutches are being switched from engagement to disengagement and vise versa.

5. An automatic transmission according to claim 4, wherein the assist mechanism is provided to the lateral rear end portion of said counter shaft in a car body.

6. An automatic transmission according to claim 4, wherein said assist mechanism is provided below a horizontal plane where a center axis of said power output shaft lies.

7. A mesh-type automatic transmission equipped with a power input shaft for introducing power of an engine, a power output shaft for outputting the driving force of the transmission, a counter shaft receiving the driving force that is transmitted from the power input shaft through a series of power input gears, a series of power output gears disposed between the counter shaft and the power output shaft, and cogged clutches provided between the series of power output gears and the power input shaft and between those power output gears and the power output shaft, the power of the engine being transmitted from the power input shaft to the power output shaft by the engagement and disengagement of the cogged clutches,
- wherein the automatic transmission comprises an assist mechanism, the assist mechanism including
- an assist counter gear that is provided on the counter shaft and adapted for idling rotation,
- an assist output gear meshed with the assist counter gear and fixed to the power output shaft, and
- a friction clutch that is provided between the assist counter gear and the counter shaft to transmit the driving force from the counter shaft to the power output shaft via the assist counter gear and the assist output gear while the cogged clutches are being switched from engagement to disengagement and vise versa.

8. An automatic transmission according to claim 7, wherein the assist mechanism is provided to the lateral rear end portion of said counter shaft in the car body.

9. An automatic transmission according to claim 7, wherein said assist mechanism is provided below a horizontal plane where a center axis of the power output shaft lies.

10. A mesh-type automatic transmission, comprising a power input shaft for introducing engine power, a plurality of transmission gears, a plurality of cogged clutches, a power output shaft for outputting driving force, a counter shaft, and a plurality of counter gears for transmitting the engine power to said power output shaft by rotating said power input shaft via the engine power, rotating said counter shaft by rotation of said power input shaft, and transmitting rotation of said counter shaft to said power output shaft via said counter gear automatically by engaging and disengaging said cogged clutch to one of said transmission gears corresponding to speed; wherein
- said counter shaft is provided with an assist mechanism for transmitting rotational force of said power input shaft to said power output shaft by transmitting rotation of said counter shaft via said assist mechanism during a gear change from the time of disengagement of a gear to the engagement of a new gear, said assist mechanism including an assist clutch having an assist counter shaft, an assist gear associated and rotatable with said counter assist shaft, and an assist output gear operatively associated with the power output shaft,
- wherein the assist mechanism responds to a switch command for the cogged clutches and starts transmitting the power from the engine to the power output shaft prior to complete release of one of the cogged clutches that is currently engaged with the transmission gear;
- the assist mechanism transmits torque in accordance with the power from the engine when the cogged clutch is completely released and disengaged from the transmission gear; and
- the assist mechanism terminates transmitting the power to the power output shaft when the cogged clutch is engaged with the transmission gear based on said switch command.

11. An automatic transmission according to claim 10, wherein said assist mechanism is provided to the lateral rear end portion of said counter shaft in the car body.

12. An automatic transmission according to claim 11, wherein said assist mechanism is provided below a horizontal plane where a center axis of said power output shaft lies.

13. An automatic transmission according to claim 12, wherein said assist mechanism starts engaging when a switch command of said cogged clutch is output before said cogged clutch currently engaged with said transmission gear is completely disengaged, transmits the rotational force of said power input shaft to said power output shaft by being engaged corresponding to the torque of the engine when said cogged clutch is completely disengaged from said engaged transmission gear, and disengages when said cogged clutch is engaged with said transmission gear to be engaged based on said switch command.

14. A mesh type automatic transmission comprising a power input shaft for introducing engine power, a plurality of transmission gears, a plurality of cogged clutches, a power output shaft for outputting driving force, a counter shaft, and a plurality of counter gears for transmitting the engine power to said power output shaft by rotating said power input shaft via the engine power, rotating said counter shaft by rotation of said power input shaft, and transmitting rotation of said counter shaft to said power output shaft via said counter gear automatically by engaging and disengaging said cogged clutch to one of said transmission gears corresponding to speed; wherein
- said counter shaft is provided with an assist mechanism for transmitting rotational force of said power input shaft to said power output shaft by transmitting rotation of said counter shaft via said assist mechanism during a gear change from the time of disengagement of a gear to the engagement of a new gear, said assist mechanism including an assist clutch having an assist counter shaft, an assist gear associated and rotatable with said assist counter shaft, and an assist output gear operatively associated with the power output shaft,
- wherein said assist mechanism is comprised of said assist clutch, which is composed of a clutch plate fixed to said counter shaft and rotated with said counter shaft for transmitting rotation of said clutch elate by pressing against said clutch plate, and said assist output gear fixed to said power output shaft and meshed with said assist gear of said assist clutch, wherein the rotation of said clutch plate is transmitted to said power output shaft via said assist gear and said assist output gear based on an assist command, wherein said assist mechanism is provided to the lateral rear end portion of said counter shaft in a car body below a horizontal plane where a center axis of said power output shaft lies, and starts engaging when a switch command of said cogged clutch is output before said cogged clutch currently engaged with said transmission gear is completely disengaged, transmits the rotational force of said power input shaft to said power output shaft by being engaged corresponding to the torque of the engine when said cogged clutch is completely disengaged from said engaged transmission gear, and disengages when said cogged clutch is engaged with said transmission gear to be engaged based on said switch command.

15. A mesh-type automatic transmission, comprising a power input shaft for introducing engine power, a plurality of transmission gears, a plurality of cogged clutches, a power output shaft for outputting driving force, a counter shaft, and a plurality of counter gears for transmitting the engine power to said power output shaft by rotating said power input shaft via the engine power, rotating said counter shaft by rotation of said power input shaft, and transmitting rotation of said counter shaft to said power output shaft via said counter gear automatically by engaging and disengaging said cogged clutch to one of said transmission gears corresponding to speed; wherein said counter shaft is provided with an assist mechanism for transmitting rotational force of said power input shaft to said power output shaft by transmitting rotation of said counter shaft via said assist mechanism during a gear change from the time of disengagement of a gear to the engagement of a new gear, said assist mechanism including an assist clutch having an assist counter shaft, an assist gear associated and rotatable with said assist counter shaft, and an assist output gear operatively associated with the power output shaft, wherein said assist mechanism starts engaging when a switch command of said cogged clutch is output before said cogged clutch currently engaged with said transmission gear is completely disengaged, transmits the rotational force of said power input shaft to said power output shaft by being engaged corresponding to the torque of the engine when said cogged clutch is completely disengaged from said engaged transmission gear, and disengages when said cogged clutch is engaged with said transmission gear to be engaged based on said switch command, and a gear ratio of the assist gear is equal to a limit of the gear ratio obtained in the plurality of transmission gears.

16. A mesh-type automatic transmission equipped with a power input shaft for introducing power of an engine, a power output shaft for outputting the driving force of the transmission, a counter shaft receiving the driving force that is transmitted from the power input shaft through a series of power input gears, a series of power output gears disposed between the counter shaft and the power output shaft, and cogged clutches provided between the series of power output gears and the power input shaft and between those power output gears and the power output shaft, the power of the engine being transmitted from the power input shaft to the power output shaft by the engagement and disengagement of the cogged clutches, wherein the automatic transmission comprises an assist mechanism, the assist mechanism including an assist counter gear provided on the counter shaft and adapted for idling rotation, the assist counter gear being different from gears used for ordinary gear shift, an assist output gear meshed with the assist counter gear and fixed to the power output shaft, the assist output gear being different from the gears used for ordinary gear shift, and a friction clutch provided between the assist counter gear and the counter shaft to transmit the driving force from the counter shaft to the power output shaft via the assist counter gear and the assist output gear while the cogged clutches are being switched from engagement to disengagement with the gears and vise versa; and a gear ratio of the assist counter gear and the assist output gear is equal to a limit of the gear ratio obtained in the series of power input gears and the series of output gears.

17. A mesh-type automatic transmission equipped with a power input shaft for introducing power of an engine, a power output shaft for outputting the driving force of the transmission, a counter shaft receiving the driving force that is transmitted from the power input shaft through a series of power input gears, a series of power output gears disposed between the counter shaft and the power output shaft, and cogged clutches provided between the series of power output gears and the power input shaft and between those power output gears and the power output shaft, the power of the engine being transmitted from the power input shaft to the power output shaft by the engagement and disengagement of the cogged clutches, wherein the automatic transmission comprises an assist mechanism, the assist mechanism including an assist counter gear provided on the counter shaft and adapted for idling rotation, the assist counter gear being different from gears used for ordinary gear shift, an assist output gear meshed with the assist counter gear and fixed to the power output shaft, the assist output gear being different from the gears used for ordinary gear shift, and a friction clutch provided between the assist counter gear and the counter shaft to transmit the driving force from the counter shaft to the power output shaft via the assist counter gear and the assist output gear while the cogged clutches are being switched from engagement to disengagement with the gears and vise versa; and a gear ratio of the assist counter gear and the assist output gear is equal to a limit of the gear ratio obtained in the series of power input gears and the series of output gears.

* * * * *